(12) United States Patent
Kakura

(10) Patent No.: US 7,336,598 B2
(45) Date of Patent: Feb. 26, 2008

(54) GUARD INTERVAL LENGTH CONTROL METHOD IN OFDM SYSTEM AND OFDM TRANSMITTING AND RECEIVING APPARATUSES

(75) Inventor: Yoshikazu Kakura, Tokyo (JP)

(73) Assignee: Nec Corporation, Tokyo (JP)

( * ) Notice: Subject to any disclaimer, the term of this patent is extended or adjusted under 35 U.S.C. 154(b) by 1067 days.

(21) Appl. No.: 10/291,656

(22) Filed: Nov. 12, 2002

(65) Prior Publication Data
US 2003/0090994 A1    May 15, 2003

(30) Foreign Application Priority Data
Nov. 13, 2001 (JP) .............................. 2001-347425

(51) Int. Cl.
*H04J 11/00* (2006.01)
*H04L 27/28* (2006.01)

(52) U.S. Cl. ...................... 370/208; 370/210; 375/260

(58) Field of Classification Search ........ 370/208–210; 375/221, 260, 261, 326, 340, 342, 350
See application file for complete search history.

(56) References Cited

U.S. PATENT DOCUMENTS

| | | | | |
|---|---|---|---|---|
| 5,694,389 A | * | 12/1997 | Seki et al. .................. | 370/208 |
| 6,108,353 A | * | 8/2000 | Nakamura et al. .......... | 370/504 |
| 6,192,056 B1 | * | 2/2001 | Tsuruoka .................... | 370/504 |
| 6,714,511 B1 | * | 3/2004 | Sudo et al. ................. | 370/208 |
| 7,133,474 B2 | * | 11/2006 | Ramasubramanian et al. ... | 375/343 |

FOREIGN PATENT DOCUMENTS

| | | |
|---|---|---|
| EP | 0 854 620 A2 | 7/1998 |
| EP | 1 014 639 A2 | 6/2000 |
| EP | 1 018 828 A2 | 7/2000 |
| EP | 1 061 687 A1 | 12/2000 |
| EP | 1 276 291 A2 | 6/2002 |
| GB | 2306084 * | 4/1997 |
| JP | 9-102774 | 4/1997 |
| JP | 2000-22660 A | 1/2000 |
| JP | 2000-244441 A | 9/2000 |
| JP | 2000-269930 A | 9/2000 |
| JP | 2001-69112 A | 3/2001 |
| WO | WO 97/30531 | 8/1997 |

* cited by examiner

*Primary Examiner*—Wing Chan
*Assistant Examiner*—Hong Sol Cho
(74) *Attorney, Agent, or Firm*—Foley & Lardner LLP

(57) ABSTRACT

A guard interval length determining apparatus in an OFDM (orthogonal frequency division multiplexing) system, includes a signal supply section and a guard interval length determining section. The signal supply section outputs a reception signal and a delayed reception signal obtained by delaying the reception signal by an effective symbol length. The guard interval length determining section adaptively determines a final guard interval section length from the reception signal and the delayed reception signal.

25 Claims, 10 Drawing Sheets

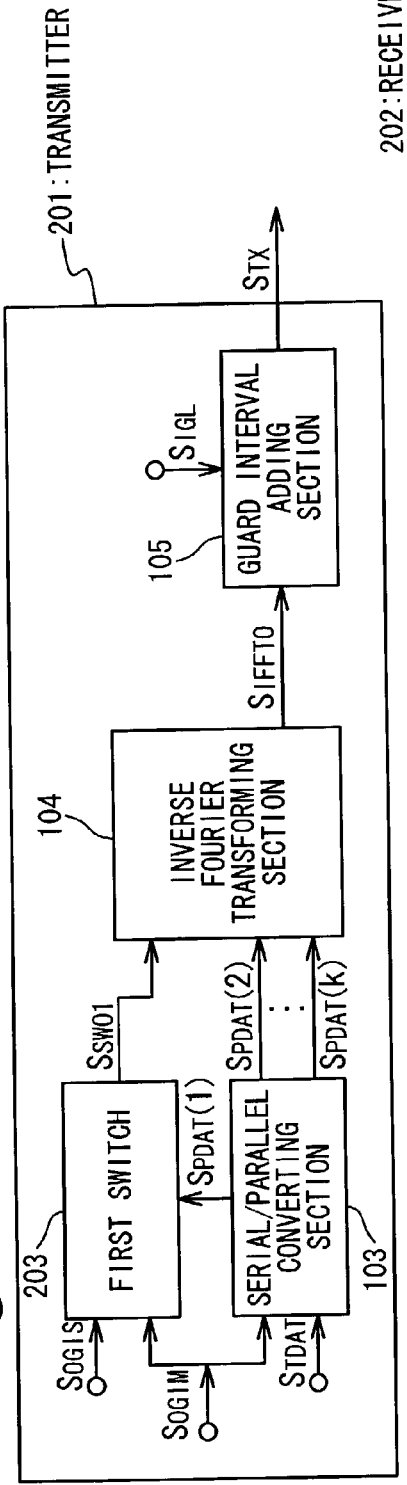
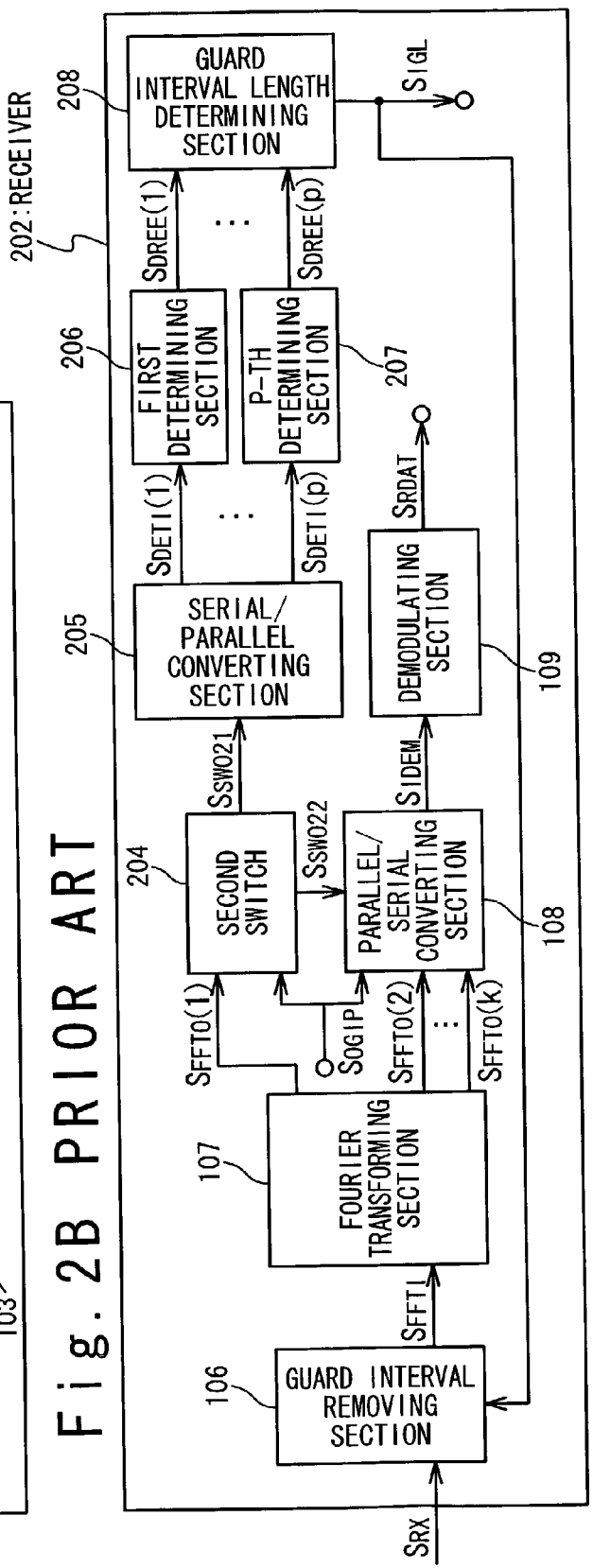
Fig. 2A PRIOR ART
Fig. 2B PRIOR ART

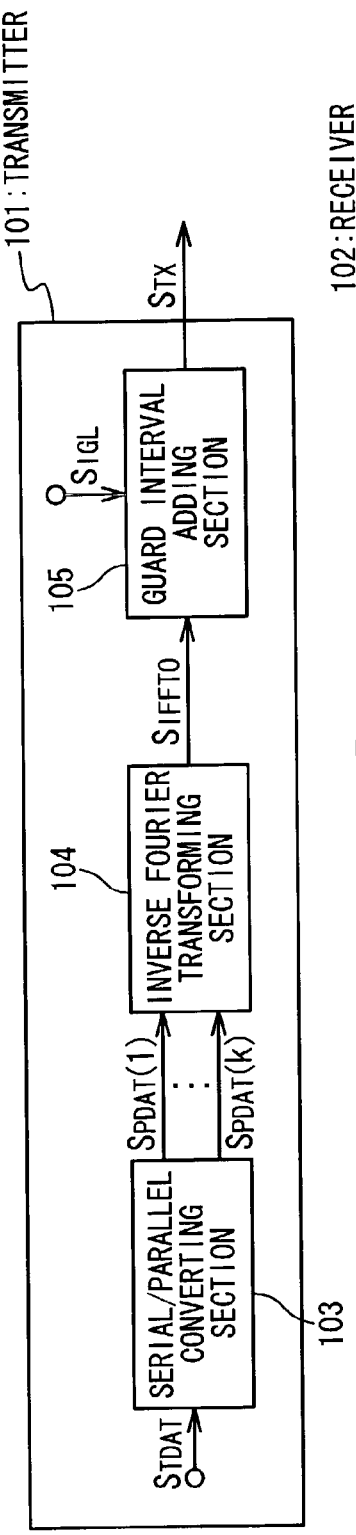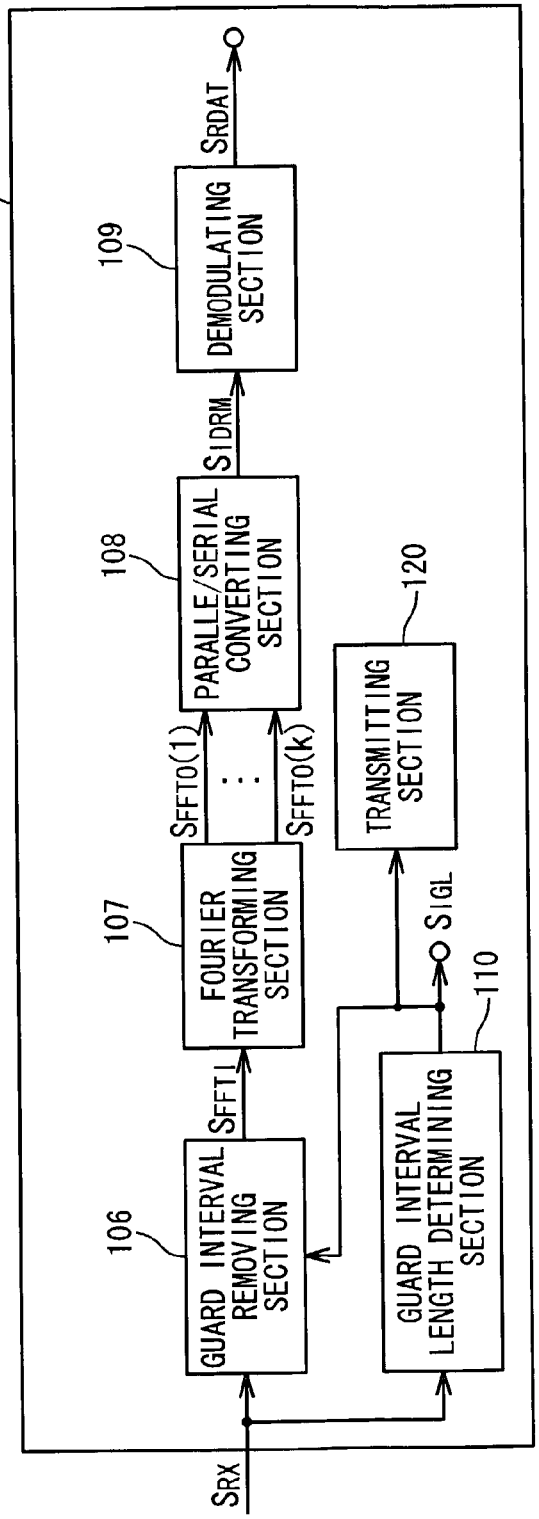

GUARD INTERVAL LENGTH CONTROL METHOD IN OFDM SYSTEM AND OFDM TRANSMITTING AND RECEIVING APPARATUSES

BACKGROUND OF THE INVENTION

1. Field of the Invention

The present invention relates to a method of controlling a guard interval section length in an orthogonal frequency division multiplexing (OFDM) method and the OFDM transmitting and receiving apparatuses which controls a guard interval section length to a line quality adaptively.

2. Description of the Related Art

An orthogonal frequency division multiplexing (OFDM) method is known as a radio transmission method which has excellent anti-multi-path characteristic.

FIG. 1 is a diagram showing the principle of a signal transmission method in a conventional OFDM transmitting and receiving apparatus. As shown in FIG. 1, in the OFDM method, a guard interval section is provided between effective symbols by the assumed maximum delay time of a transmission signal transmitted from a transmitting apparatus, in order to exclude the influence of interference between the transmission signal and a multi-path signal. A part of the following effective symbol is copied and added to the guard interval section, and then the transmission signal is transmitted. In a receiving apparatus, since the guard interval section which degrades due to the interference between symbols, the guard interval section is removed. Thus, the interference between symbols in the multi-path is restrained.

In the signal transmission system of such an OFDM system, when the guard interval section length is longer, it is possible to cope with the larger delay in the multi-path. However, the data transmission efficiency degrades if the guard interval section is made longer than a necessary length. Therefore, excellent anti-multi-path characteristic can be realized, if the guard interval section length is made minimum and the guard interval section length is adaptively controlled in accordance with the change of a propagation environment when the maximum delay of the delayed signal changes due to the change of the propagation environment. Also, it is possible to avoid the reduction of the data transmission efficiency.

As a conventional method of adaptively controlling the guard interval section length is known in Japanese Laid Open Patent application (JP-P2000-244441A), in which a signal is multiplexed to one of sub-carriers to estimate an optimal guard interval section length. Hereinafter, the structure of the OFDM transmitting and receiving apparatus in this conventional example will be described.

FIGS. 2A and 2B are diagrams showing the OFDM transmitting and receiving apparatuses, in which data of a guard interval section length is multiplexed with one of sub-carriers and transmitted. The transmitting apparatus 201 is composed of a serial/parallel converting section 103, a first switch 203, an inverse Fourier transforming section 104, and a guard interval adding section 105. The serial/parallel converting section 103 inputs transmission data $S_{TDAT}$. The first switch 203 is controlled based on the ON/OFF state of a symbol multiple signal $S_{OGIM}$ for selection of the guard interval section length. The first switch 203 selectively outputs one of an optimal guard interval section length selection signal $S_{OGIS}$ or a parallel output of p symbols showing the guard interval section length. The inverse Fourier transforming section 104 carries out inverse Fourier transform. The guard interval adding section 105 inserts a guard interval section based on a guard interval section length data $S_{IGL}$.

Also, a receiving apparatus 202 is composed of a guard interval removing section 106, a Fourier transforming section 107, a parallel/serial converting section 108, a demodulating section 109, a second switch 204, a serial/parallel converting section 205, determining sections 206 and 207, and a guard interval length determining section 208. The guard interval removing section 106 removes the guard interval section from a reception signal $S_{RX}$ based on the guard interval section length data $S_{IGL}$. The Fourier transforming section 107 carries out Fourier transform. The parallel/serial converting section 108 carries out parallel/serial conversion to Fourier transform output signals. The second switch 204 is controlled based on the ON/OFF state of a guard interval section length selection symbol process signal $S_{OGIP}$, and outputs one of the Fourier transform output signals to the parallel/serial converting section 108 or serial/parallel converting section 205. The demodulating section 109 demodulates reception data from the output of the parallel/serial converting section 108. The determining sections 206 and 207 determine the outputs of the serial/parallel converting section 205. The guard interval length determining section 208 determines the guard interval section length based on determination error signals outputted from the determining sections 206 and 207, and outputs the guard interval section length data $S_{IGL}$. The operations of the OFDM transmitting and receiving apparatuses shown in FIGS. 2A and 2B are as follows.

In the transmitting apparatus 201, the serial/parallel converting section 103 is controlled by the ON/OFF state of the guard interval section length selection symbol multiple signal $S_{OGIM}$. When the guard interval section length selection symbol multiple signal $S_{OGIM}$ is in the OFF state, the serial/parallel converting section 103 converts transmission data $S_{TDAT}$ into k parallel data signals $S_{PDAT}(1)$ to $S_{PDAT}(k)$ (k is an integer equal to or larger than 2). When the guard interval section length selection symbol multiple signal $S_{OGIM}$ is in the ON state, the serial/parallel converting section 103 converts the transmission data $S_{TDAT}$ into (k−1) parallel data signals $S_{PDAT}(2)$ to $S_{PDAT}(k)$. The first switch 203 is controlled in accordance with the ON/OFF state of the guard interval section length selection symbol multiple signal $S_{OGIM}$. When the guard interval section length selection symbol multiple signal $S_{OGIM}$ is in the OFF state, the first switch 203 selects $S_{PDAT}(1)$ which is one of the k parallel data signals. When the guard interval section length selection symbol multiple signal $S_{OGIM}$ is in the ON state, and the first switch 203 selects the optimal guard interval section length selection signal $S_{OGIS}$ which consists of p symbols showing p (p is an integer equal to or larger than 2) kinds of different guard interval section lengths. Thus, the first switch 203 outputs the selected signal as a first switch output signal $S_{SWO1}$. The inverse Fourier transforming section 104 carries out inverse Fourier transform to the first switch output signal $S_{SWO1}$ and the parallel data signal $S_{PDAT}(2)$ to $S_{PDAT}(k)$, and outputs an inverse Fourier transform output signal $S_{IFFTO}$. The guard interval adding section 105 is controlled based on the guard interval section length data $S_{IGL}$, copies a part of inverse Fourier transform output signal $S_{IFFTO}$ which is specified by the guard interval section length data $S_{IGL}$, adds to the inverse Fourier transform output signal $S_{IFFTO}$ as a guard interval section, and outputs as a transmission signal $S_{TX}$.

In the receiving apparatus 202, the guard interval removal section 106 removes the guard interval section from a reception signal $S_{RX}$ based on the guard interval section length data $S_{IGL}$ to be described later, and outputs as a Fourier transform input signal $S_{FFTI}$. The Fourier transforming section 107 carries out Fourier conversion to the Fourier transform input signal $S_{FFTI}$, and outputs Fourier transform output signals $S_{FFTO}(1)$ to $S_{FFTO}(k)$. The second switch 204 outputs $S_{FFTO}(1)$ which is one of the k Fourier transform output signals as a second switch first output signal $S_{SWO21}$, when the guard interval section length selection symbol process signal $S_{OGIP}$ in the ON state. Also, the second switch 204 outputs the same Fourier transform output signal $S_{FFTO}(1)$ as a second switch second output signal $S_{SWO22}$, when the guard interval section length selection symbol process signal $S_{OGIP}$ is in the OFF state. The serial/parallel converting section 205 carries out serial/parallel conversion to the second switch first output signal $S_{SWO21}$ to output p determining section input signals $S_{DETI}(1)$ to $S_{DETI}(p)$ The first determining section 206 to the p-th determining section 207 output determination error signals $S_{DERR}(1)$ to $S_{DERR}(p)$ as the determining section input signal $S_{DETI}(1)$ to $S_{DETI}(p)$. The guard interval length determining section 208 determines the guard interval section length and outputs the guard interval section length data $S_{IGL}$. The guard interval section length is used in the next transmission by the guard interval adding section 105 of the transmitting apparatus 101 based on the determination error signals $S_{DERR}(1)$ to $S_{DERR}(p)$ corresponding to the p kind of guard interval section lengths. The parallel/serial converting section 108 carries out parallel/serial conversion to the (k−1) Fourier transform output signals $S_{FFTO}(2)$ to $S_{FFTO}(k)$, when the guard interval section length selection symbol process signal $S_{OGIP}$ is in the ON state, and carries out the parallel/serial conversion to the (k−1) Fourier transform output signals $S_{FFTO}(2)$ to $S_{FFTO}(k)$ and the second switch second output signal $S_{SWO22}$ when the guard interval section length selection symbol process signal $S_{OGIP}$ is in the OFF state. Thus, parallel/serial converting section 108 outputs a demodulating section input signal $S_{IDEM}$. The demodulating section 109 determines the transmission data based on the demodulating section input signal $S_{IDEM}$ and outputs a reception data signal $S_{RDAT}$.

As such, in the OFDM transmitting and receiving apparatuses shown in FIGS. 2A and 2B, the optimal guard interval section length selection signal include a plurality of symbols showing a plurality of different guard interval section lengths and is supplied to the inverse Fourier transforming section 104, which receives to the respective frequency signals (sub-carriers) in a frequency domain. Therefore, the optimal guard interval section length selection signal is multiplexed to one of the sub-carriers in a time domain signal outputted from inverse Fourier transforming section 104. In this way, in the receiving apparatus 202, the determination error signal is detected to each symbol, and the control of the optimal guard interval section length can be made possible in the anti-multi-path characteristic and the data transmission efficiency.

However, in the above-mentioned conventional OFDM transmitting and receiving apparatuses, the optimal guard interval section length selection signal $S_{OGIS}$ is multiplexed with one sub-carrier to select the optimal guard interval section length. The sub-carrier is used for a purpose other than an original signal transmission. Therefore, the data transmission efficiency is reduced. Also, the conversion ratio in the serial/parallel conversion of the transmission data in the transmitting apparatus and the conversion ratio of the parallel/serial conversion in the reception apparatus are different between a time interval during which the optimal guard interval section length selection signal is multiplexed and a time interval during which the optimal guard interval section length selection signal is not multiplexed based on switching operations by the first and second switches 203 and 204. Therefore, the structure and operation of the transmitting apparatus and reception apparatus becomes complicated.

In conjunction with the above description, an automatic frequency control method is disclosed in Japanese Laid Open Patent application (JP-P-Heisei 9-102774). In this conventional example, an OFDM signal having a guard interval is received, and a frequency conversion is carried out to the OFDM reception signal into a complex modulation signal at a base band by an orthogonal detector using a local oscillation signal. The complex modulated signal is converted into a digital signal. A discrete Fourier transform is carried out to a part of the guard interval section of the digital signal. Also, a discrete Fourier transform is carried out to a part of an effective symbol section apart from the part of the guard interval section from by the effective symbol section. A complex division is carried out to the above discrete Fourier transform results, and the complex division result is phase-converted. The phase conversion result is converted into an analog signal, which is filtered. The local oscillation signal is controlled based on the filtering result.

Also, a digital communication apparatus is disclosed in Japanese Laid Open Patent Application (JP-P2000-22660A). In this conventional example, a frequency converting section inputs an OFDM signal in which a pilot symbol containing a predetermined known pilot signal is inserted and obtains a base band signal using a reproduction carrier. A window function calculating section multiplies the base band signal by a function of window except for a rectangular window. A decoding section converts the output of the window function calculating section into the output of a frequency domain. A known sequence generating section generates a sequence based on the predetermined known sequence and the window function for every carrier frequency. A frequency error estimating section estimates a frequency error of the reproduction carrier used by the frequency converting section based on a correlation of the output from the decoding section and a sequence generated by the known sequence generating section and controls the frequency error of the reproduction carrier.

Also, a multi-carrier reception apparatus is disclosed in Japanese Laid Open Patent Application (JP-P2000-269930A). In this example, a signal of an effective symbol length is extracted from a signal composed of an effective symbol and a guard interval in which a part of the effective symbol is copied and a time window is determined fro discrete Fourier transform. A modulated reception signal in a phase modulation is orthogonally demodulated, and the signal of the effective symbol length is extracted at timing from the demodulated signal. Discrete Fourier transform is carried out to each of the signals of the effective symbol length, and the complex vectors of the different carriers in frequency as result of the discrete Fourier transform are compared. Thus, the effective symbol extracting timing is controlled in feedback such that the variance relating value with the complex vectors of the carriers takes a minimal value.

Also, an OFDM transmitting apparatus is disclosed in Japanese Laid Open Patent Application (JP-P2001-69112A). In this example, data sequences of many partial channels is OFDM modulated in a predetermined frequency band and transmitted, and the data sequence of a desired channel from the data sequences of many partial reception channels can be demodulated. In an OFDM transmission apparatus, a mapping circuit carries out a mapping operation to a plurality of data sequences having a different central frequency and a different bandwidth independently. A multiplexing unit multiplexes in frequency the plurality of mapping signals. A frequency converter 18 converts in frequency the orthogonal modulation signal based on the central frequency of the central frequencies of the plurality of data sequences. In an OFDM reception apparatus, a channel selector sets a frequency of the data sequence to be selected from the received channels. A frequency converter converts in frequency a signal of a frequency obtained by adding a middle frequency to the selected frequency and a received signal. A frequency converter carries out a frequency correction in accordance with a difference between the difference of the central frequency of the center frequencies of the plurality of data sequences and the selected frequency.

SUMMARY OF THE INVENTION

Therefore, an object of the present invention is to provide a method of controlling a guard interval section length in the OFDM system and an OFDM transmitting and receiving apparatuses for the same, in which a data transmission efficiency is not reduced.

Another object of the present invention is to provide a method of controlling a guard interval section length in the OFDM system and an OFDM transmitting and receiving apparatuses for the same, in which a guard interval section length can be determined adaptively to propagation environment without transmission and reception of data of the guard interval section length between effective symbols.

Another object of the present invention is to provide a method of controlling a guard interval section length in the OFDM system and an OFDM transmitting and receiving apparatuses for the same, in which a guard interval section length can be determined with a simple structure.

In an aspect of the present invention, a guard interval length determining apparatus in an OFDM (orthogonal frequency division multiplexing) system, includes a signal supply section and a guard interval length determining section. The signal supply section outputs a reception signal and a delayed reception signal obtained by delaying the reception signal by an effective symbol length. The guard interval length determining section adaptively determines a final guard interval section length from the reception signal and the delayed reception signal.

Here, the guard interval length determining section may calculate at least a correlation value between a part of an effective symbol section of the reception signal and a part of a guard interval section of the delayed reception signal, determine a guard interval section length based on the correlation value, and output the final guard interval section length based on the determined guard interval section length.

In this case, the guard interval length determining section may include a correlation processing section and a determining section. The correlation processing section calculates the correlation value between the part of the effective symbol section of the reception signal and the part of the guard interval section of the delayed reception signal. The determining section determines the guard interval section length based on the correlation value, and outputs the determined guard interval section length as the final guard interval section length.

Instead, the guard interval length determining section may include a correlation processing section, a determining section and an averaging section. The correlation processing section calculates the correlation value between the part of the effective symbol section of the reception signal and the part of the guard interval section of the delayed reception signal. The averaging section averages the correlation values over a plurality of symbols, and outputs the average as the correlation value. The determining section determines the guard interval section length based on the correlation value from the averaging section, and determines the final guard interval section length based on the determined guard interval section length.

Otherwise, the guard interval length determining section may include a correlation processing section, a determining section and an estimating section. The correlation processing section calculates the correlation value between the part of the effective symbol section of the reception signal and the part of the guard interval section of the delayed reception signal. The estimating section estimates a correlation value based on a temporal change of said correlation values over a plurality of symbols. The determining section determines the guard interval section length based on the correlation value from said estimating section and determines said final guard interval section length based on the determined guard interval section length.

In this case, the guard interval length determining section:

may calculate the correlation value between the last N samples of the guard interval section of the reception signal (N is an arbitrary natural number equal to or less than the number of samples in the guard interval section) and the last N samples of the effective symbol section of the reception signal, may elongate the final guard interval section length when the correlation value is smaller than a first threshold value, may keep the final guard interval section length when the correlation value is equal to or larger than the first threshold value and smaller than a second threshold value larger than the first threshold value, and may shorten the final guard interval section length when the correlation value is equal to or larger than the second threshold value.

In this case, the guard interval length determining section:

may elongate the final guard interval section length based on a difference between the correlation value and the first threshold value, when the correlation value is smaller than the first threshold value, and may shorten the final guard interval section length based on a difference between the correlation value and the second threshold value, when the correlation value is equal to or larger than the second threshold value.

Also, the guard interval length determining section:

may calculate a first correlation value as the correlation value between the last N samples of the guard interval section of the reception signal (N is an arbitrary natural number equal to or less than the number of samples in the guard interval section) and the last N samples of the effective symbol section of the reception signal, may elongate the final guard interval length when the first correlation value is smaller than a first threshold value, may calculate a second correlation value as the correlation value between N samples from the (N+1)-th sample to (2N)-th sample from the end of the guard interval section and N samples from the (N+1)-th sample to (2N)-th sample from the end of the effective symbol section, when the first correlation value is equal to or larger than the first threshold value, may keep the final guard interval section length when the second correlation value is smaller than a second threshold value, and may shorten the final guard interval section length, when the second correlation value is equal to or larger than the second threshold value.

In this case, the guard interval length determining section:

may elongate the final guard interval section length based on a difference between the first correlation value and the first threshold value, when the first correlation value is smaller than the first threshold value, and may shorten the final guard interval section length based on a difference between the second correlation value and the second threshold value when the second correlation value is equal to or larger than the second threshold value.

Also, the guard interval length determining section:

may calculate first to M-th correlation values the correlation values between first to M-th sections obtained by dividing the last MN samples (M and N are arbitrary natural numbers that MN is equal to or less than the number of samples in the guard interval section) of the guard interval section for every N samples from the end of the guard interval section and corresponding ones of first to M-th sections obtained by dividing the last MN samples of the effective symbol section for every N samples from the end of the effective symbol section, respectively, may elongate the final guard interval section length, when any one of the first to i-th correlation values (i is an arbitrary natural number equal to or less than M−1) is smaller than a predetermined threshold value, may keep the final guard interval section length, when all of the first to i-th correlation values are equal to or larger than the threshold value and one of the (i+1)-th to j-th correlation values (j is an arbitrary natural number equal to larger than i+1 or equal to or smaller than M) is smaller than the threshold value V, and may shorten the final guard interval section length, when all of the first to j-th correlation values are equal to or larger than the threshold value.

In this case, a k-th correlation value is first smaller than the threshold value, starting from the first correlation value, and the guard interval length determining section:

may elongate the guard interval section length longer when k is smaller, if k is equal to or larger than 1 and smaller than i, and may shorten the guard interval section length when k is larger, if k is larger than j.

In another aspect of the present invention, an OFDM receiving apparatus include a guard interval length determining section, a guard interval removing section, a Fourier transforming section, a parallel/serial converting section and a demodulating section. The guard interval length determining section adaptively determines a final guard interval section length from a reception signal. The guard interval removing section removes the guard interval section from the reception signal based on the final guard interval section length from the guard interval length determining apparatus to produce a guard-interval-section-removed signal. The Fourier transforming section carries out Fourier transform to the guard-interval-section-removed signal to produce a transformed signal. The parallel/serial converting section carries out parallel/serial conversion to the transformed signal to produce a converted signal. The demodulating section demodulates the converted signal to produce a demodulated data.

In this case, the guard interval length determining section may include a signal supply section and a length determining section. The signal supply section outputs a reception signal and a delayed reception signal obtained by delaying the reception signal by an effective symbol length. The length determining section adaptively determines a final guard interval section length from the reception signal and the delayed reception signal.

In this case, the length determining section may calculate at least a correlation value between a part of an effective symbol section of the reception signal and a part of a guard interval section of the delayed reception signal, determine a guard interval section length based on the correlation value, and output the final guard interval section length based on the determined guard interval section length.

In this case, the length determining section may include a correlation processing section and a determining section. The correlation processing section calculates the correlation value between the part of the effective symbol section of the reception signal and the part of the guard interval section of the delayed reception signal. The determining section determines the guard interval section length based on the correlation value, and outputs the determined guard interval section length as the final guard interval section length.

Also, the length determining section may include a correlation processing section, a determining section and an averaging circuit. The correlation processing section calculates the correlation value between the part of the effective symbol section of the reception signal and the part of the guard interval section of the delayed reception signal. The averaging section averages the correlation values over a plurality of symbols and outputs the average as a correlation value. The determining section determines the guard interval section length based on said correlation value from the averaging circuit, and determines the final guard interval section length based on the guard interval section length.

Also, the length determining section may include a correlation processing section, a determining section and an estimating circuit. The correlation processing section calculates the correlation value between the part of the effective symbol section of the reception signal and the part of the guard interval section of the delayed reception signal. The estimating section estimates a correlation value based on a temporal change of the correlation values over a plurality of symbols. The determining section determines the guard interval section length based on the correlation value from the estimating section and determines the final guard interval section length based on the guard interval section length.

Also, the length determining section:

may calculate the correlation value between the last N samples of the guard interval section of the delayed reception signal (N is an arbitrary natural number equal to or less than the number of samples in the guard interval section) and the last N samples of the effective symbol section of the reception signal, may elongate the final guard interval section length when the correlation value is smaller than a first threshold value, may keep the final guard interval section length when the correlation value is equal to or larger than the first threshold value and smaller than a second threshold value larger than the first threshold value, and may shorten the final guard interval section length when the correlation value is equal to or larger than the second threshold value.

In this case, the length determining section:

may elongate the final guard interval section length based on a difference between the correlation value and the first threshold value, when the correlation value is smaller than the first threshold value, and may shorten the final guard interval section length based on a difference between the correlation value and the second threshold value, when the correlation value is equal to or larger than the second threshold value.

Also, the length determining section:

may calculate a first correlation value as the correlation value between the last N samples of the guard interval section of the delayed reception signal (N is an arbitrary natural number equal to or less than the number of samples in the guard interval section) and the last N samples of the effective symbol section of the reception signal, may elongate the final guard interval length when the first correlation value is smaller than a first threshold value, may calculate a second correlation value as the correlation value between N samples from the (N+1)-th sample to (2N)-th sample from the end of the guard interval section of the delayed reception signal and N samples from the (N+1)-th sample to (2N)-th sample from the end of the effective symbol section of the reception signal, when the first correlation value is equal to or larger than the first threshold value, may keep the final guard interval section length when the second correlation value is smaller than a second threshold value, and may shorten the final guard interval section length, when the second correlation value is equal to or larger than the second threshold value.

In this case, the length determining section:

may elongate the final guard interval section length based on a difference between the first correlation value and the first threshold value, when the first correlation value is smaller than the first threshold value, and may shorten the final guard interval section length based on a difference between the second correlation value and the second threshold value when the second correlation value is equal to or larger than the second threshold value.

Also, the length determining section:

may calculate first to M-th correlation values the correlation values between first to M-th sections obtained by dividing the last MN samples (M and N are arbitrary natural numbers that MN is equal to or less than the number of samples in the guard interval section) of the guard interval section of the delayed reception signal for every N samples from the end of the guard interval section and corresponding ones of first to M-th sections obtained by dividing the last MN samples of the effective symbol section of the reception signal for every N samples from the end of the effective symbol section, respectively, may elongate the final guard interval section length, when any one of the first to i-th correlation values (i is an arbitrary natural number equal to or less than M−1) is smaller than a predetermined threshold value, may keep the final guard interval section length, when all of the first to i-th correlation values are equal to or larger than the threshold value and one of the (i+1)-th to j-th correlation values (j is an arbitrary natural number equal to larger than i+1 or equal to or smaller than M) is smaller than the threshold value V, and may shorten the final guard interval section length, when all of the first to j-th correlation values are equal to or larger than the threshold value.

In this case, a k-th correlation value may be first smaller than the threshold value, starting from the first correlation value. In this case, the length determining section:

may elongate the guard interval section length longer when k is smaller, if k is equal to or larger than 1 and smaller than i, and may shorten the guard interval section length when k is larger, if k is larger than j.

Also, the OFDM receiving apparatus may further include a transmitting section which transmitting the final guard interval section length.

In another aspect of the present invention, an OFDM system includes an OFDM transmitting apparatus and an OFDM receiving apparatus. The OFDM transmitting apparatus carries out serial/parallel conversion to a transmission data signal to produce a serial/parallel converted signal, carries out inverse Fourier transform to the serial/parallel converted signal to produce an inversely transformed signal, adds a guard interval section into the inversely transformed signal based on a final guard interval section length, and transmits the inversely transformed signal to which guard interval section is added, as a transmission signal. The OFDM receiving apparatus receives the transmission signal as a reception signal, adaptively determines a final guard interval section length from the reception signal and a delayed reception signal obtained by delaying the reception signal by a length of an effective symbol section, determines the transmission data signal from the reception signal based on the final guard interval section length, and transmits the final guard interval section length to the OFDM transmitting apparatus for next transmission.

Here, the OFDM receiving apparatus may be composed of a guard interval length determining section, a guard interval removing section, a Fourier transforming section, a parallel/serial converting section, a demodulating section, and a transmitting section. The guard interval length determining section adaptively determines the final guard interval section length from the reception signal and the delayed reception signal obtained by delaying the reception signal by the effective symbol section length. The guard interval removing section removes a guard interval section from the reception signal based on the final guard interval section length from the guard interval length determining section to produce a guard-interval-section-removed signal. The Fourier transforming section carries out Fourier transform to the guard-interval-section-removed signal to produce a transformed signal. The parallel/serial converting section carries out parallel/serial conversion to the transformed signal to produce a converted signal. The demodulating section demodulates the converted signal to produce a demodulated data signal. The transmitting section transmitting the final guard interval section length to the OFDM transmitting apparatus.

In this case, the guard interval length determining section may include a signal supply section which outputs the reception signal and the delayed reception signal obtained by delaying the reception signal by the effective symbol section length; and a guard interval length determining section which adaptively determines the final guard interval section length from the reception signal and the delayed reception signal.

In another aspect of the present invention, a guard interval length determining method in an OFDM (orthogonal frequency division multiplexing) system, may be achieved by (a) generating a delayed reception signal obtained by delaying a reception signal by a length of an effective symbol section; and by (b) adaptively determining a final guard interval section length from the reception signal and the delayed reception signal.

Here, the (a) adaptively determining step may be achieved by calculating at least a correlation value between a part of an effective symbol section of the reception signal and a part of a guard interval section of the delayed reception signal; by determining a guard interval section length based on the correlation value; and by determining the final guard interval section length based on the determined guard interval section length.

Also, the (a) adaptively determining step may be achieved by calculating the correlation value between the part of the effective symbol section of the reception signal and the part of the guard interval section of the delayed reception signal; by averaging the correlation values over a plurality of symbols to output the average as an averaged correlation value; by determining the guard interval section length based on the averaged correlation value; and by determining the final guard interval section length based on the guard interval section length.

Otherwise, the (a) adaptively determining step may be achieved by calculating said correlation value between the part of the effective symbol section of the reception signal and the part of the guard interval section of the delayed reception signal; by estimating a correlation value based on a temporal change of the correlation values over a plurality of symbols; by determining the guard interval section length based on the estimated correlation value; and by determining said final guard interval section length from the determined guard interval section length.

Also, the (a) adaptively determining step may be achieved by calculating the correlation value between the last N samples of the guard interval section of the delayed reception signal (N is an arbitrary natural number equal to or less than the number of samples in the guard interval section) and the last N samples of the effective symbol section of the reception signal, by (c) elongating the final guard interval section length when the correlation value is smaller than a first threshold value, by keeping the final guard interval section length when the correlation value is equal to or larger than the first threshold value and smaller than a second threshold value larger than the first threshold value, and by (d) shortening the final guard interval section length when the correlation value is equal to or larger than the second threshold value.

In this case, the (c) elongating step may be achieved by elongating the final guard interval section length based on a difference between the correlation value and the first threshold value, when the correlation value is smaller than the first threshold value. Also, the (d) shortening step may be achieved by shortening the final guard interval section length based on a difference between the correlation value and the second threshold value, when the correlation value is equal to or larger than the second threshold value.

Also, the (a) adaptively determining step may be achieved by calculating a first correlation value as the correlation value between the last N samples of the guard interval section of the delayed reception signal (N is an arbitrary natural number equal to or less than the number of samples in the guard interval section) and the last N samples of the effective symbol section of the reception signal, by (e) elongating the final guard interval length when the first correlation value is smaller than a first threshold value, by calculating a second correlation value as the correlation value between N samples from the (N+1)-th sample to (2N)-th sample from the end of the guard interval section and N samples from the (N+1)-th sample to (2N)-th sample from the end of the effective symbol section, when the first correlation value is equal to or larger than the first threshold value, by keeping the final guard interval section length when the second correlation value is smaller than a second threshold value, and by (f) shortening the final guard interval section length, when the second correlation value is equal to or larger than the second threshold value.

In this case, the (e) elongating step may be achieved by elongating the final guard interval section length based on a difference between the first correlation value and the first threshold value, when the first correlation value is smaller than the first threshold value. Also, the (f) shortening step may be achieved by shortening the final guard interval section length based on a difference between the second correlation value and the second threshold value when the second correlation value is equal to or larger than the second threshold value.

Also, the (a) adaptively determining step may be achieved by calculating first to M-th correlation values the correlation values between first to M-th sections obtained by dividing the last MN samples (M and N are arbitrary natural numbers that MN is equal to or less than the number of samples in the guard interval section) of the guard interval section for every N samples from the end of the guard interval section and corresponding ones of first to M-th sections obtained by dividing the last MN samples of the effective symbol section for every N samples from the end of the effective symbol section, respectively, by (g) elongating the final guard interval section length, when any one of the first to i-th correlation values (i is an arbitrary natural number equal to or less than M−1) is smaller than a predetermined threshold value, by keeping the final guard interval section length, when all of the first to i-th correlation values are equal to or larger than the threshold value and one of the (i+1)-th to j-th correlation values (j is an arbitrary natural number equal to larger than i+1 or equal to or smaller than M) is smaller than the threshold value V, and by (h) shortening the final guard interval section length, when all of the first to j-th correlation values are equal to or larger than the threshold value.

In this case, when a k-th correlation value is first smaller than the threshold value, starting from the first correlation value, the (e) elongating step may be achieved by elongating the guard interval section length longer when k is smaller, if k is equal to or larger than 1 and smaller than i. Also, the (h) shortening step may be achieved by shortening the guard interval section length when k is larger, if k is larger than j.

In another aspect of the present invention, a method of receiving a transmission signal by an OFDM receiving apparatus, may be achieved by (a) adaptively determining a final guard interval section length from a reception signal and a delayed reception signal obtained by delaying the reception signal by a length of an effective symbol section; by (b) removing a guard interval section from the reception signal based on the final guard interval section length from the guard interval length determining section to produce a guard-interval-section-removed signal; by (c) carrying out Fourier transform to the guard-interval-section-removed signal to produce a transformed signal; by (d) carrying out parallel/serial conversion to the transformed signal to produce a converted signal; and by (e) demodulating the converted signal to produce a demodulated data signal.

Here, the (a) adaptively determining step may be achieved by (f) generating the reception signal and the delayed reception signal obtained by delaying the reception signal by the effective symbol length; and by (g) adaptively determining the final guard interval section length from the reception signal and the delayed reception signal.

In this case, the (g) adaptively determining step may be achieved by calculating at least a correlation value between a part of the effective symbol section of the reception signal and a part of the guard interval section of the delayed reception signal; by determining a guard interval section length based on the correlation value; and by determining the final guard interval section length based on the determined guard interval section length.

Also, the method may further include the step of: transmitting the final guard interval section length to a unit which has transmitted the transmission signal.

In another aspect of the present invention, a method of communicating between an OFDM transmitting apparatus and an OFDM receiving apparatus in an OFDM system, may be achieved by (a) transmitting, from the OFDM transmitting apparatus, a transmission signal which includes a transmission data signal and in which a guard interval section is added based on a final guard interval section length, by (b) receiving the transmission signal as a reception signal by the OFDM receiving apparatus; by (c) adaptively determining the final guard interval section length from the reception signal and a delayed reception signal obtained by delaying the reception signal by a length of an effective symbol section; by (d) obtaining the transmission data signal from the reception signal using the determined final guard interval section length; and by (e) transmitting the determined final guard interval section length to the OFDM transmitting apparatus.

In this case, the (c) adaptively determining step may be achieved by calculating at least a correlation value between a part of the effective symbol section of the reception signal and a part of the guard interval section of the delayed reception signal; by determining a guard interval section length based on the correlation value; and by determining the final guard interval section length based on the determined guard interval section length.

BRIEF DESCRIPTION OF THE DRAWINGS

FIGS. 2A and 2B are block diagrams showing the structures of conventional OFDM transmitting and receiving apparatuses;

FIGS. 3A and 3B are block diagram showing the structures of the OFDM transmitting and receiving apparatuses according to the present invention;

DESCRIPTION OF THE PREFERRED EMBODIMENTS

Figure 1:
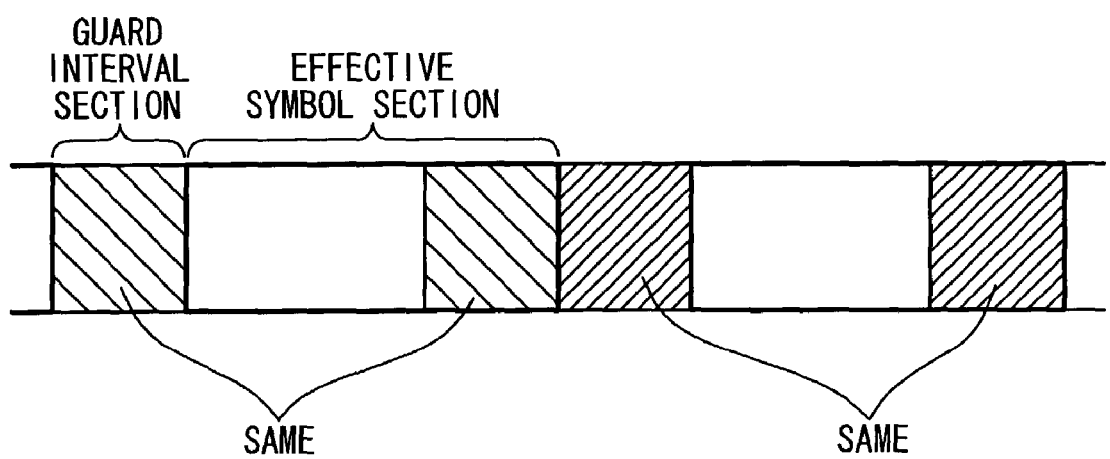
FIG. 1 is a diagram showing a symbol structure in an OFDM communication system.

Hereinafter, a method of controlling a guard interval section length in an OFDM (orthogonal frequency division multiplexing) system composed of an OFDM transmitting apparatus and an OFDM receiving apparatus according to the present invention will be described with reference to the attached drawings.

FIGS. 3A and 3B are block diagrams showing the structures of the OFDM transmitting apparatus and the OFDM receiving apparatus according to the present invention. The OFDM system of the present invention is composed of the OFDM transmitting apparatus 101, and the OFDM receiving apparatus 102 to the transmitting apparatus 101. Also, the OFDM system may be composed of the OFDM transmitting apparatus 101 which transmits transmission data to another transmitting apparatus, and the OFDM receiving apparatus 102 which receives reception data from the other transmitting apparatus. Hereinafter, the structure of the OFDM system of the former will be described as an example.

The OFDM transmitting apparatus 101 is composed of a serial/parallel converting section 103, an inverse Fourier transforming section 104 and a guard interval adding section 105. The serial/parallel converting section 103 inputs transmission data. The inverse Fourier transforming section 104 carries out inverse Fourier transform to an output of the serial/parallel converting section 103. The guard interval adding section 105 adds a guard interval section to the output of the inverse Fourier transforming section 104 based on guard interval section length data ($S_{IGL}$) in units of effective data.

Also, the OFDM receiving apparatus 102 is composed of a guard interval removing section 106, a Fourier transforming section 107, a serial/parallel converting section 108, a demodulating section 109, a guard interval length determining section 110, and a transmitting section 120. The guard interval length determining section 110 inputs a reception signal and outputs the guard interval section length data $S_{IGL}$. The guard interval removing section 106 removes a guard interval section based on the output of the guard interval length determining section 110. The Fourier transforming section 107 inputs an output of the guard interval removing section 106. The serial/parallel converting section 108 inputs an output of the Fourier transforming section 107. The demodulating section 109 inputs an output of the serial/parallel converting section 108. Also, the transmitting section 120 transmits the guard interval section length data $S_{IGL}$ to the OFDM transmitting apparatus 101. The OFDM transmitting apparatus 101 is further composed of a receiving section (not shown) which receives the guard interval section length data $S_{IGL}$.

Hereinafter, the operations of the OFDM transmitting apparatus 101 and the OFDM receiving apparatus 102 of the OFDM system will be described, respectively.

In the OFDM transmitting apparatus 101, the serial/parallel converting section 103 converts transmission data $S_{TDAT}$ into k parallel data signals $S_{PDAT}(1)$ to $S_{PDAT}(k)$ (k is an integer equal to or larger than 2). The inverse Fourier transforming section 104 carries out inverse Fourier transform to the parallel data signals $S_{PDAT}(1)$ to $S_{PDAT}(k)$ and outputs an inverse Fourier transform output signal $S_{IFFTO}$. In this case, the inverse Fourier transforming section 104 has a function to convert a frequency domain signal into a time domain signal. The k parallel data signals $S_{PDAT}(1)$ to $S_{PDAT}(k)$ (k is an integer equal to or more than 2) outputted from the serial/parallel converting section 103 are converted into the signal $S_{IFFTO}$ on the time axis. The signal $S_{IFFTO}$ has a frequency characteristic and is composed of a plurality of frequencies (sub-carrier) which have the respective signal level. The guard interval adding section 105 is controlled based on the guard interval section length data $S_{IGL}$ to be described later. The guard interval adding section 105 copies a part of inverse Fourier transform output signal $S_{IFFTO}$ based on a specification of guard interval section length data $S_{IGL}$, and adds the copied data to the inverse Fourier transform output signal $S_{IFFTO}$ as a guard interval section. Thus, the guard interval adding section 105 outputs as a transmission signal $S_{TX}$, a signal in which the guard interval section is added. The transmission signal $S_{TX}$ has the symbol structure of the OFDM system, in which data in the last portion of the effective symbol is copied and inserted as the guard interval section, as shown in FIG. 1.

Also, in the OFDM receiving apparatus 102, the guard interval length determining section 110 inputs a reception signal $S_{RX}$ from the OFDM transmitting apparatus 101, and determines the guard interval section length from the reception signal $S_{RX}$. The guard interval section length is used in next transmission by the guard interval adding section 105 of the OFDM transmitting apparatus 101. Thus, the guard interval length determining section 110 outputs as the guard interval section length data $S_{IGL}$. The guard interval removing section 106 holds the guard interval section length for next reception, and the guard interval section length has been determined by the guard interval length determining section 110 based on the guard interval section length data $S_{IGL}$ in a previous reception signal. The guard interval removing section 106 removes the guard interval section inserted by the guard interval adding section 105 of the OFDM transmitting apparatus 101 from reception signal $S_{RX}$ by using the held guard interval section length data $S_{IGL}$, and outputs as a Fourier transform input signal $S_{FFTI}$. The Fourier transforming section 107 carries out Fourier transform to the Fourier transform input signal $S_{FFTI}$ and outputs Fourier transform output signals $S_{FFTO}(1)$ to $S_{FFTO}(k)$. Here, the Fourier transforming section 107 has a function to convert a frequency domain signal into a time domain signal. The Fourier transforming section 107 outputs parallel data signals corresponding to the respective signal levels of the signals of the plurality of frequencies (sub-carriers) on the frequency axis as the Fourier transform output signals $S_{FFTO}(1)$ to $S_{FFTO}(k)$ The parallel/serial converting section 108 inputs the Fourier transform output signals $S_{FFTO}(1)$ to $S_{FFTO}(k)$ and converts the parallel data signals into a serial data signal and outputs it as a demodulating section input signal $S_{IDEM}$. The demodulating section 109 inputs the demodulating section input signal $S_{IDEM}$, determines reception data and outputs a demodulated reception data signal $S_{RDAT}$.

Next, the control system of the guard interval section length according to the first embodiment of the present invention will be described. The principle of the determination of the guard interval section length in the present invention will be described first.

Figure 4:
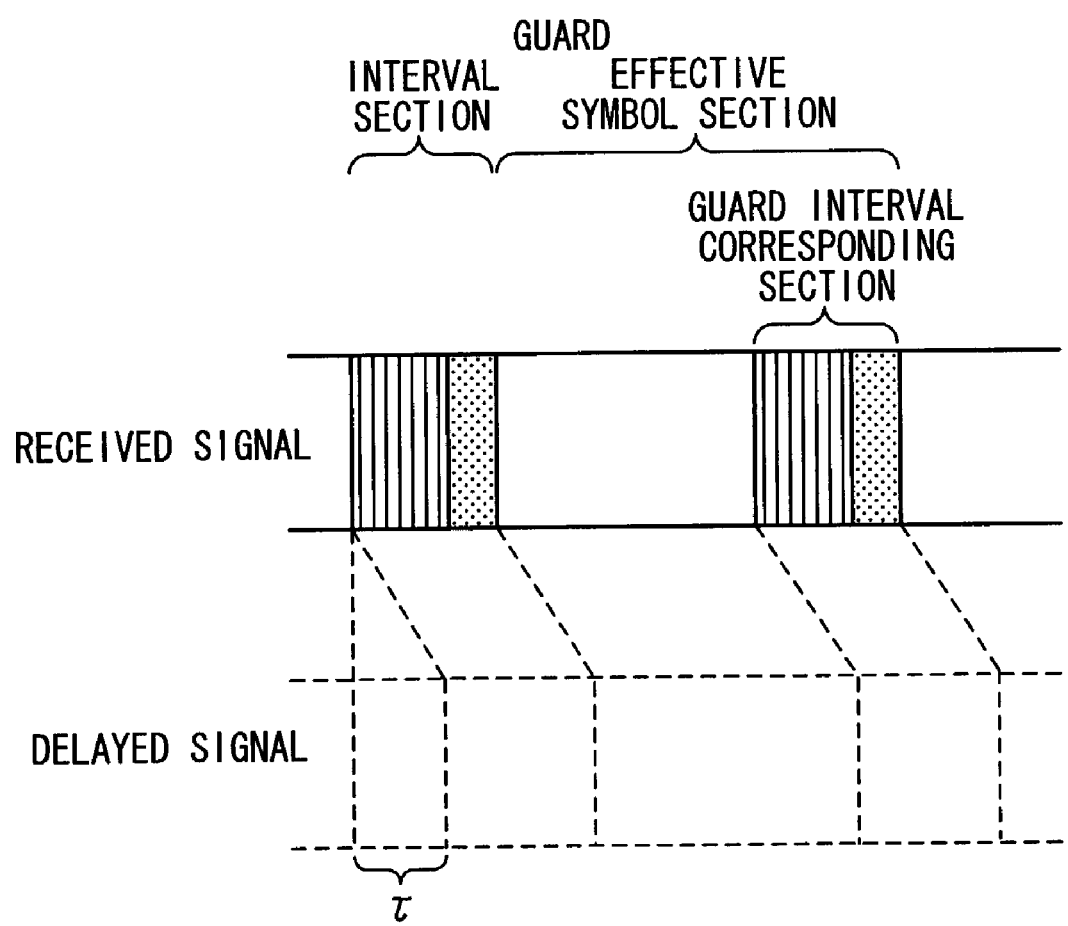
FIG. 4 is a diagram showing the influence of multi-path interference to a guard interval section.

FIG. 4 is a diagram showing the influence of multi-path to the guard interval section. In the propagation environment under which the multi-path is caused, a delayed signal is superimposed on the reception signal due to the multi-path, and the interference between symbols due to the delayed signal is caused. When the maximum delay time of the delayed signal is τ, the guard interval section of the reception signal receives interference between symbols due to a previous effective symbol in a time portion τ of the beginning, as shown in FIG. 4. However, the other part receives the interference from only the guard interval section itself (a leading part of the guard interval). In a part of the effective symbol section corresponding to the guard interval section (hereinafter, to be referred to as "guard interval corresponding section"), the leading τ time portion receives the interference from a part before the guard interval corresponding section. However, the other portion receives interference only from the guard interval corresponding section itself (a leading part of the guard interval corresponding section).

Therefore, the leading τ time part of the guard interval section of the reception signal has a low correlation with the leading τ time part of the guard interval corresponding section. On the other hand, the remaining part of the guard interval section coincides with that of the guard interval corresponding section, and the correlation is 1. In the present invention, the optimal guard interval section length is determined using the difference in such a correlation value.

Figure 5:
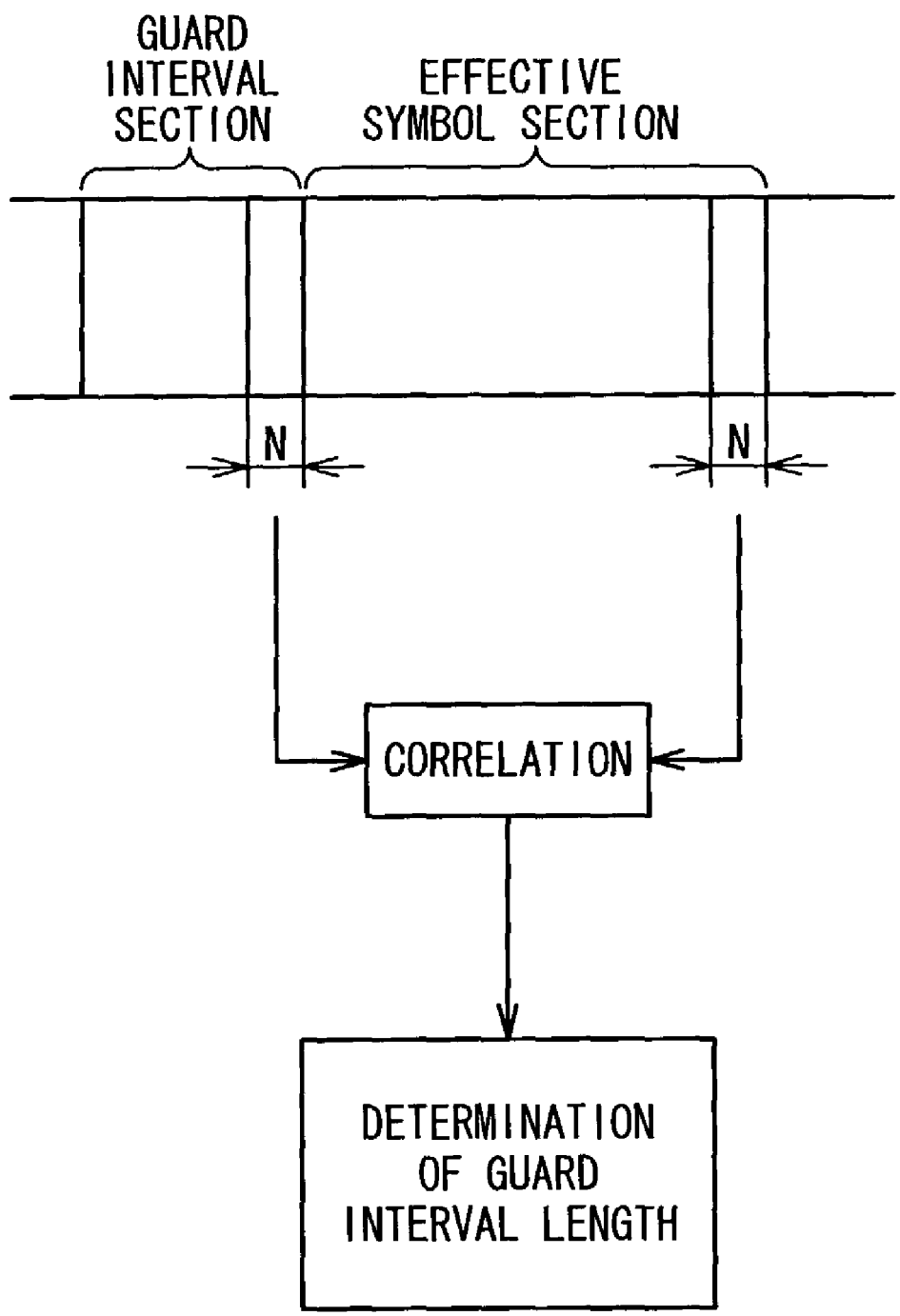
FIG. 5 is a diagram showing a first embodiment of the present invention.

FIG. 5 is a diagram showing a control system of the guard interval section length in the first embodiment. In the first embodiment, a correlation value is calculated between the last N samples of the guard interval section (N is an arbitrary natural number equal to or less than the number of samples in the guard interval section) and the last N samples of the effective symbol section, and the guard interval section length is determined based on the correlation value.

More specifically, if the last N samples of the guard interval section used for the calculation of the correlation value does not receive interference between symbols at all, the correlation value between the last N samples of the guard interval section and the last N samples of the effective symbol section is 1. When the part receiving interference between symbols becomes larger, the correlation value becomes smaller. Therefore, the guard interval length determining section 110 determines that the guard interval section length is not enough or there is not a margin when the correlation value is very small, and elongates the guard interval section length in accordance with the correlation value. On the other hand, when the correlation value is very large, the guard interval length determining section 110 determines that the guard interval is too longer than necessary, and shortens the guard interval section length in accordance with the correlation value. Also, when the correlation value takes a value in a middle range, the guard interval length determining section 110 keeps or holds the current guard interval section length. Thus, the guard interval length determining section 110 determines an optimal guard interval section length and outputs the guard interval section length data $S_{IGL}$. In the above, two different threshold values may be used.

Figure 6:
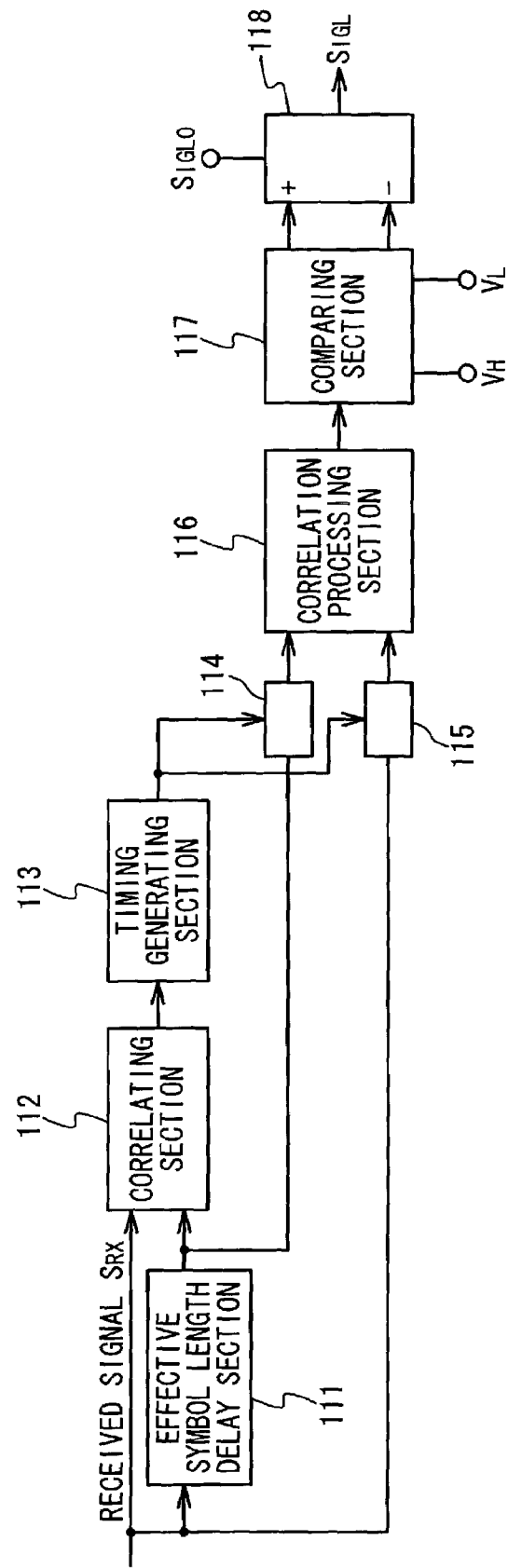
FIG. 6 is a diagram showing the structure of a guard interval length determining section in the OFDM receiving apparatus according to the first embodiment of the present invention.

FIG. 6 is a diagram showing the structure of the guard interval length determining section in the first embodiment. The guard interval length determining section 110 is composed of a symbol length delay section 111, a correlation section 112, a timing generating section 113, gate sections 114 and 115, a correlation processing section 116, a comparing section 117 and a guard interval section length output section 118.

The symbol length delay section 111 inputs the reception signal $S_{RX}$ and delays it by the effective symbol period. The correlation section 112 calculates the correlation value between the output of the symbol length delay section 111 and the reception signal $S_{RX}$. The timing generating section 113 generates a timing signal for the guard interval section from the output of the correlation section 112, and outputs the timing signal to the gate sections 114 and 115. The timing signal is used to extract the last N samples of the guard interval section. The correlation processing section 116 calculates a correlation value between the reception signal $S_{RX}$ and the delayed reception signal $S_{RX}$ delayed by the effective symbol period.

The correlation section 112 carries out a correlation value calculation between the reception signal $S_{RX}$ and the reception signal $S_{RX}$ delayed by the effective symbol period, determines timings when the correlation value becomes maximum. The timings correspond to the guard interval corresponding section. In the above process, the guard interval section of the reception signal $S_{RX}$ corresponds to the last part of the effective symbol section. Therefore, the correlation value is the maximum in the time interval corresponding to the guard interval corresponding section of the effective symbol section. In this way, it is possible to detect the time interval of the guard interval corresponding section or the start and end timing. The timing generating section 113 generates a gate signal for the last N-sample period of the guard interval section from the timings. The gate sections 114 and 115 extract the last N samples of the guard interval section of the reception signal $S_{RX}$ and the last N samples of the effective symbol section of the reception signal $S_{RX}$ delayed by the effective symbol period. The correlation processing section 116 determines a correlation value between the respective N samples.

A comparing section 117 has a comparator function of a window type in which threshold values Vh and Vl are set as two predetermined different comparison references. The comparing section 117 inputs the correlation value and outputs a comparison resultant signal by comparing it with the threshold values Vh and Vl. The comparing section 117 outputs a + control signal as the comparison resultant signal to elongate the guard interval section length, when the correlation value is smaller than threshold value Vl, and outputs a – control signal as the comparison resultant signal to shorten the guard interval section length when the correlation value is larger than threshold value Vh. No control signal is outputted to hold the guard interval section length when the correlation value is in the range between the threshold value Vh and the threshold value Vl. The guard interval section length output section 118 is set with a preset initial value $S_{IGLO}$ as the guard interval section length, and outputs the guard interval section length data $S_{IGL}$ by increasing from the initial value in response to the + control signal or decreasing from the initial value in response to the – control signal. In this embodiment, the initial value $S_{IGLO}$ of the guard interval section length is used as the guard interval section length data $S_{IGL}$ in the initial stage of transmission from the OFDM transmitting apparatus. The optimal guard interval section length can be determined in the guard interval length determining section adaptively through the above operation.

The Second Embodiment

Figure 7:
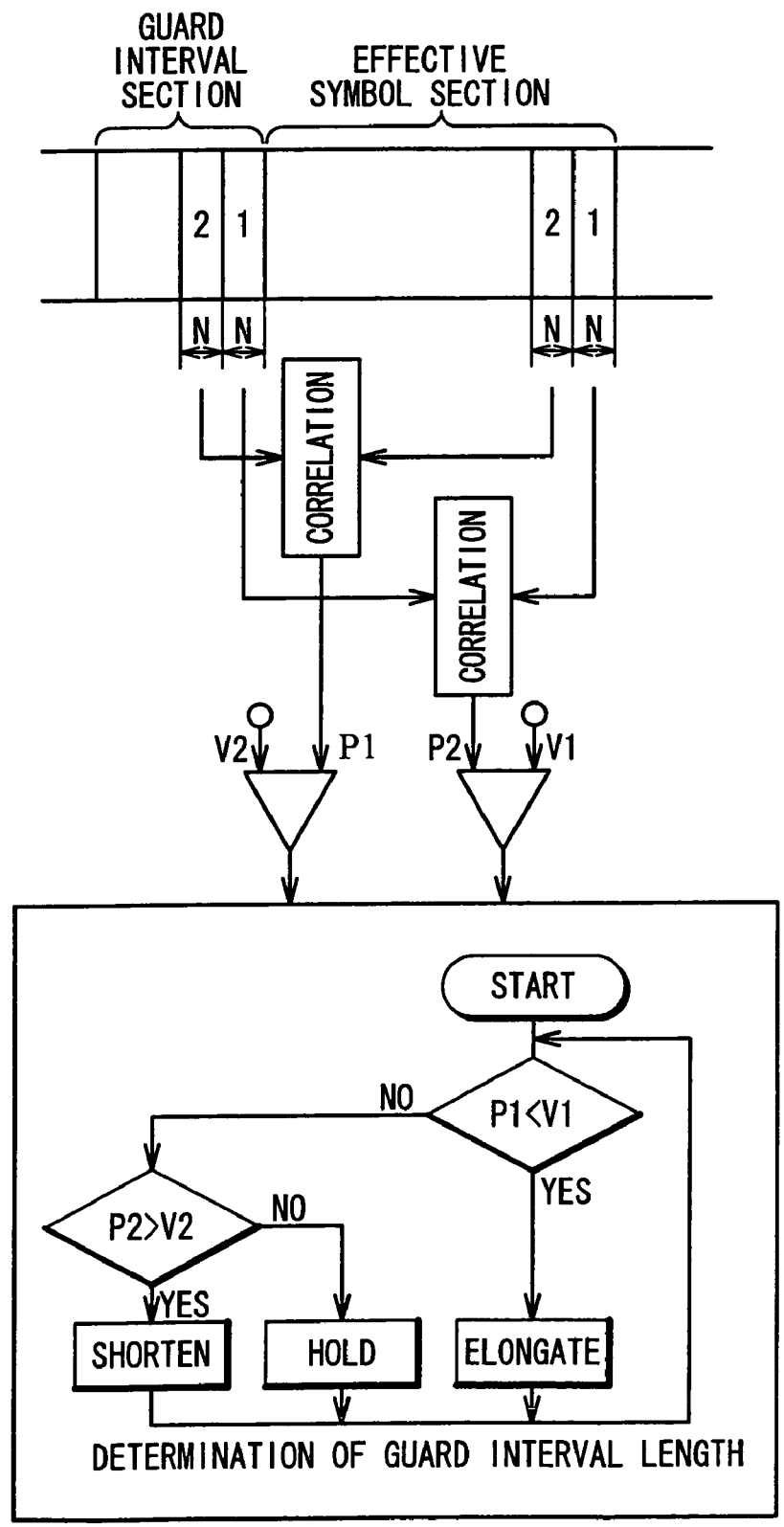
FIG. 7 is a diagram showing a second embodiment of the present invention.

FIG. 7 is a diagram showing the control system of the guard interval section length in the second embodiment. In the second embodiment, the correlation value P1 between the last N samples of the guard interval section (N is an arbitrary natural number equal to or less than the number of samples in the guard interval section) and the last N sample of the effective symbol section is calculated, and the correlation value P1 is compared with the threshold value V1. When the correlation value P1 is smaller than the threshold value V1, a control is carried out to elongate the guard interval section length. Also, when the correlation value P1 is equal to or larger than the threshold value V1, a correlation value P2 as the N-sample correlation value is calculated between N samples between the (N+1)-th sample and the 2N-th sample from the end of the guard interval section and N samples between the (N+1)-th sample to the 2N-th sample from the end of the effective symbol section is calculated. When the correlation value P2 is smaller than the threshold value V2, the current guard interval section length is held. When the correlation value P2 is equal to or more than the threshold value V2, a control is carried out to shorten the guard interval section length.

In the second embodiment, when the correlation value P1 is smaller than the threshold value V1, it is determined that a part of the guard interval section where receives interference between symbols is wide, and the guard interval section length is made longer. When the correlation value P2 is equal to or larger than the threshold value V2, it is determined that a part of the guard interval section where receive interference between symbols is narrow and the guard interval section is longer than necessary, and the guard interval section length is made shorter. When the correlation value P1 is equal to or larger than the threshold value V1 and the correlation value P2 is smaller than the threshold value V2, the guard interval section length is determined to be appropriate and is held.

Also, in the second embodiment, when the correlation value P1 is smaller than the threshold value V1, the guard interval section length may be made longer in accordance with the difference between the correlation value P1 and the threshold value V1. Also, when the correlation value P2 is equal to or larger than the threshold value V2, the control may be carried out for the guard interval section length to be made shorter in accordance with the difference between the correlation value P2 and the threshold value V2.

Third Embodiment

Figure 8:
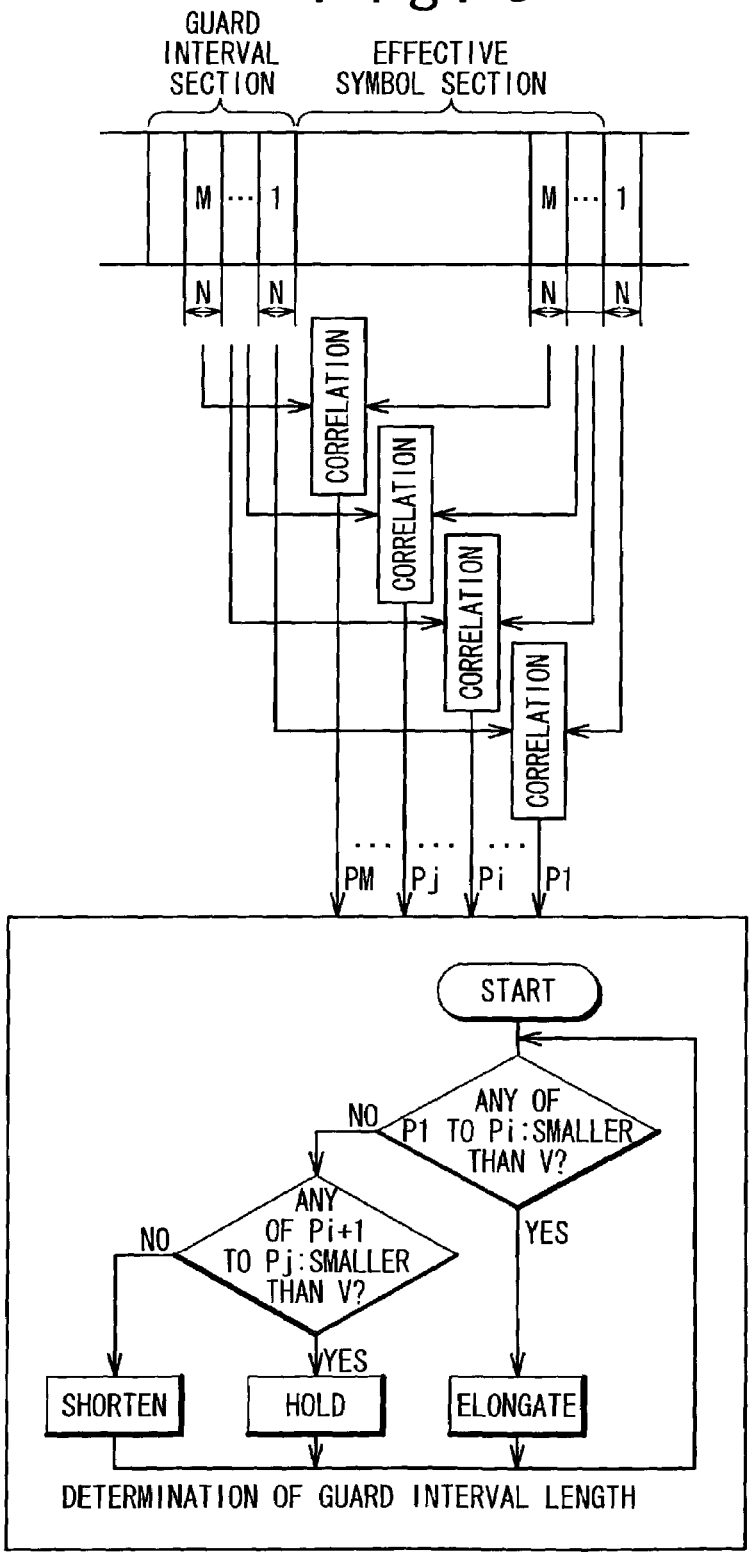
FIG. 8 is a diagram showing a third embodiment of the present invention.

FIG. 8 is a diagram showing the control system for the guard interval section length in the third embodiment. In the third embodiment, the correlation values P1 to PM are calculated between the sections 1 to M obtained by dividing the last MN samples (M and N are arbitrary natural numbers that MN is equal to or less than the number of samples in the guard interval section) of the guard interval section for every N samples from the end of the guard interval section and corresponding ones of the sections 1 to M obtained by dividing the last MN samples of the effective symbol section for every N samples from the end of the effective symbol section, respectively.

It is determined that there are parts of the guard interval section where receive interference between symbols, when any of the correlation values P1 to Pi (i is an arbitrary natural number equal to or less than M−1) is smaller than a predetermined threshold value V. At this time, the guard interval section length is made longer. The guard interval section length is determined to be appropriate and held, when all of the correlation values P1 to Pi are equal to or larger than the threshold value V and when at least one of the correlation values Pi+1 to Pj (j is an arbitrary natural number equal to larger than i+1 or equal to or smaller than M) is smaller the threshold value V. The guard interval section length is determined to be longer than necessary and is made shorter, when all of the correlation values P1 to Pj are equal to or larger than the threshold value V.

It should be noted that a control quantity to the guard interval section length may be determined by detecting the time interval corresponding to the correlation value which is first smaller than the threshold value, when the comparison between the correlation value and the threshold is started from the correlation value P1. Also, each of the threshold values in this embodiment can be appropriately set to the different value.

Also, in this embodiment, it is supposed that the correlation value which is first smaller than the threshold value when the comparison between the correlation value and the threshold is started from the correlation value P1 is set as the k-th correlation value Pk. In this case, if k is equal to or larger than 1 and equal to or smaller than i, the guard interval section length is made longer when k is smaller. Also, if k is larger than j, the guard interval section length is made shorter when k is larger.

Fourth Embodiment

In the control system of the guard interval section length in the embodiments described above, the guard interval section length may be made longer or shorter in units of the predetermined length in accordance with the correlation value. It is possible to optimally set the control sensitivity of the guard interval section length by the setting the predetermined length.

Figure 9:
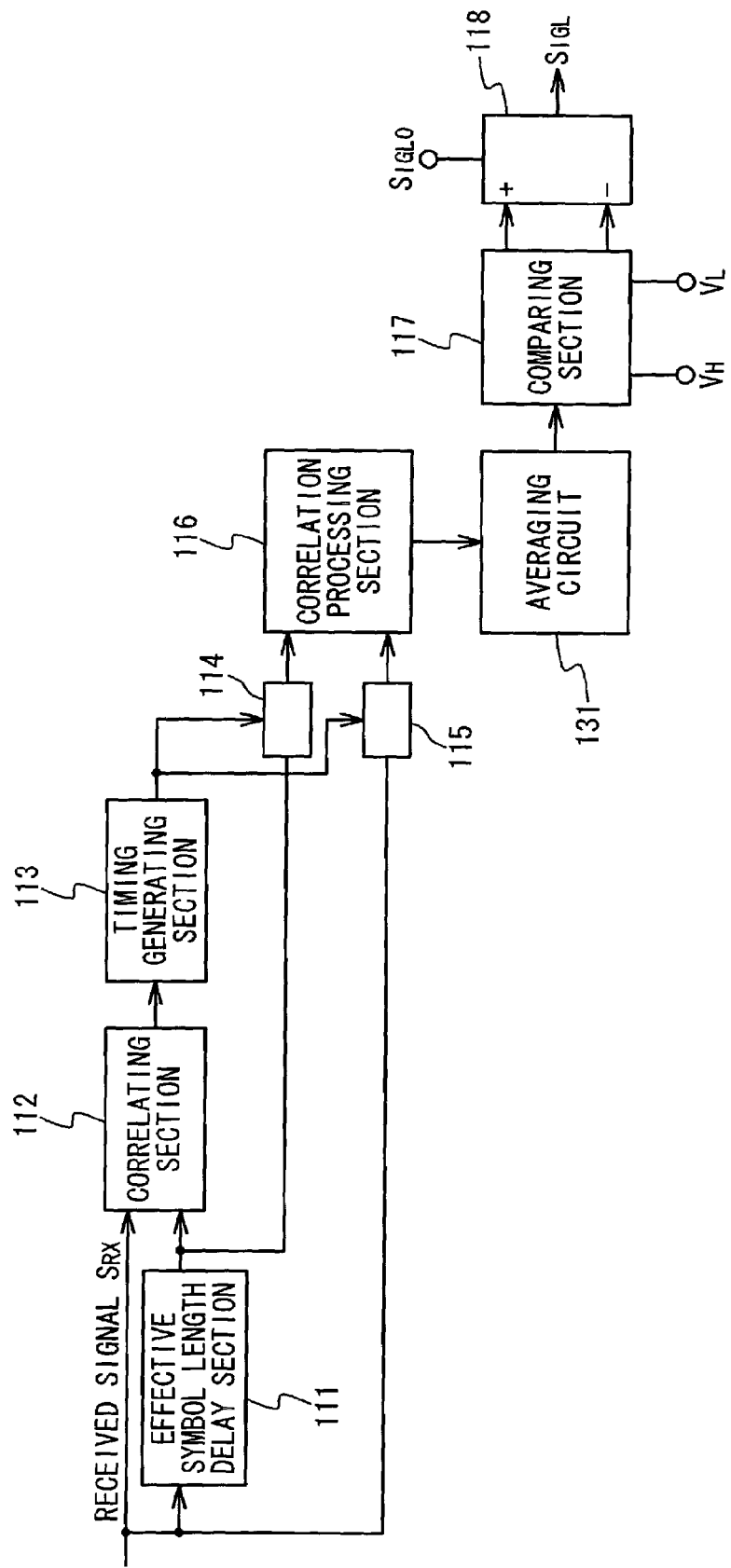
FIG. 9 is a diagram showing the structure of a guard interval length determining section in the OFDM receiving apparatus according to another embodiment of the present invention.

Also, an averaging circuit 131 may be provided as shown in FIG. 9. In this case, in the calculation of the correlation value to be used for the control of the guard interval section length, an average of the correlation values over a plurality of symbols is calculated by the averaging circuit 131 and the average may be used as the correlation value for the control.

Figure 10:
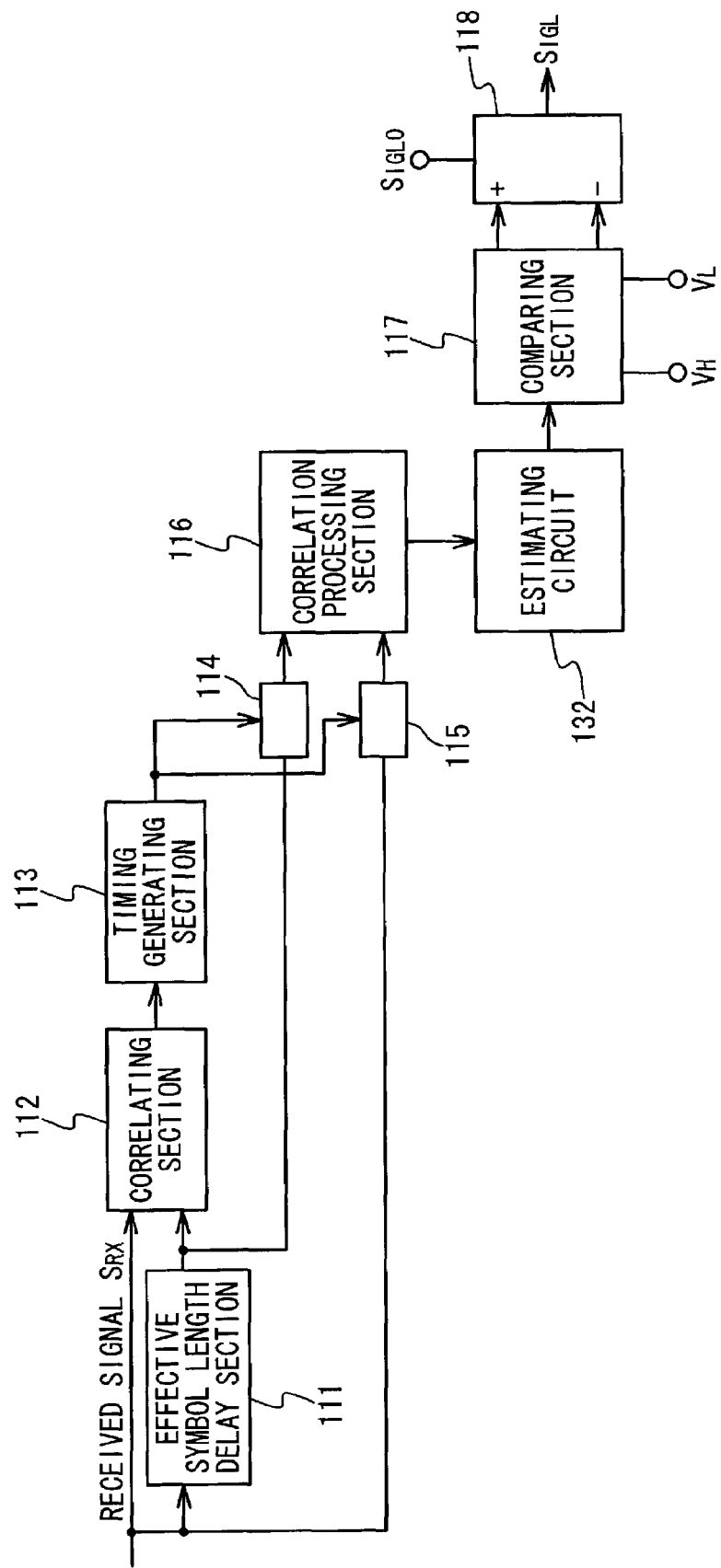
FIG. 10 is a diagram showing the structure of a guard interval length determining section in the OFDM receiving apparatus according to another embodiment of the present invention.

Also, an estimating circuit 132 may be provided as shown in FIG. 10. The estimating circuit 132 estimates the correlation value based on the time change of the correlation values calculated over the plurality of symbols and the estimated correlation value may be used for the control of the guard interval section length.

In the examples shown in FIGS. 9 and 10, the average of the correlation values is calculated and the correlation value is estimated. However, the average of the guard interval section lengths may be calculated or the correlation value may be estimated.

Moreover, as the transmission signal in the OFDM system of the present invention, a signal format may be employed in which the length of the effective symbol section does not depend on the change of the guard interval section length. In addition, a signal format may be used in which the length of the effective symbol section is controlled in accordance with the control of the guard interval section length such that a summation of the guard interval section length and the length of the effective symbol section is constant.

As described above, according to the present invention, by using the characteristic of the reception signal which undergoes influence of multi-path, the optimal guard interval section length data can be acquired adaptively in accordance with the line quality. Therefore, it is possible to always determine the optimal guard interval section length without inserting a special signal about the guard interval section length in a transmission path of the OFDM system. Also, it is not necessary to transmit a special control signal about the guard interval section length to the transmission path of the OFDM system. Therefore, the efficiency of the OFDM transmission is never decreased. Also, the conversion ratio control in the serial/parallel conversion circuit and the parallel/serial conversion circuit is unnecessary. As a result, the structures of the OFDM transmitting apparatus and the OFDM receiving apparatus can be simplified.

What is claimed is:

1. A guard interval length determining apparatus in an OFDM (orthogonal frequency division multiplexing) system, comprising:

a signal supply section which outputs a reception signal and a delayed reception signal obtained by delaying said reception signal by a length of an effective symbol section; and a guard interval length determining section which adaptively determines a final guard interval section length from said reception signal and said delayed reception signal, wherein said guard interval length determining section calculates at least a correlation value between a part of an effective symbol section of said reception signal and a part of a guard interval section of said delayed reception signal, determines a guard interval section length based on said correlation value, and outputs said final guard interval section length based on the determined guard interval section length, wherein said guard interval length determining section comprises:

a correlation processing section which calculates said correlation value between the part of said effective symbol section of said reception signal and the part of said guard interval section of said delayed reception signal;

an averaging section which averages said correlation values over a plurality of symbols, and outputs the average as a correlation value; and a determining section which determines the guard interval section length based on the correlation value from the averaging section, and determines said final guard interval section length based on the determined guard interval section length.

2. A guard interval length determining apparatus in an OFDM (orthogonal frequency division multiplexing) system, comprising:

a signal supply section which outputs a reception signal and a delayed reception signal obtained by delaying said reception signal by a length of an effective symbol section; and a guard interval length determining section which adaptively determines a final guard interval section length from said reception signal and said delayed reception signal, wherein said guard interval length determining section calculates at least a correlation value between a part of an effective symbol section of said reception signal and a part of a guard interval section of said delayed reception signal, determines a guard interval section length based on said correlation value, and outputs said final guard interval section length based on the determined guard interval section length, wherein said guard interval length determining section comprises:

a correlation processing section which calculates said correlation value between the part of said effective symbol section of said reception signal and the part of said guard interval section of said delayed reception signal;

an estimating section which estimates a correlation value based on a temporal change of said correlation values over a plurality of symbols; and a determining section which determines the guard interval section length based on the correlation value from said estimating section and determines said final guard interval section length based on the determined guard interval section length.

3. A guard interval length determining apparatus in an OFDM (orthogonal frequency division multiplexing) system, comprising:
a signal supply section which outputs a reception signal and a delayed reception signal obtained by delaying said reception signal by a length of an effective symbol section; and
a guard interval length determining section which adaptively determines a final guard interval section length from said reception signal and said delayed reception signal,
wherein said guard interval length determining section calculates at least a correlation value between a part of an effective symbol section of said reception signal and a part of a guard interval section of said delayed reception signal, determines a guard interval section length based on said correlation value, and outputs said final guard interval section length based on the determined guard interval section length,
wherein said guard interval length determining section:
calculates said correlation value between the last N samples of said guard interval section of said delayed reception signal (N is an optional natural number equal to or less than the number of samples in the guard interval section) and the last N samples of said effective symbol section of said reception signal,
elongates said final guard interval section length when said correlation value is smaller than a first threshold value,
keeps said final guard interval section length when said correlation value is equal to or larger than said first threshold value and smaller than a second threshold value larger than said first threshold value, and
shortens said final guard interval section length when said correlation value is equal to or larger than said second threshold value.

4. The guard interval length determining apparatus in an OFDM system according to claim 3, wherein said guard interval length determining section:
elongates said final guard interval section length based on a difference between said correlation value and said first threshold value, when said correlation value is smaller than said first threshold value, and
shortens said final guard interval section length based on a difference between said correlation value and said second threshold value, when said correlation value is equal to or larger than said second threshold value.

5. A guard interval length determining apparatus in an OFDM (orthogonal frequency division multiplexing) system, comprising:
a signal supply section which outputs a reception signal and a delayed reception signal obtained by delaying said reception signal by a length of an effective symbol section; and
a guard interval length determining section which adaptively determines a final guard interval section length from said reception signal and said delayed reception signal,
wherein said guard interval length determining section calculates at least a correlation value between a part of an effective symbol section of said reception signal and a part of a guard interval section of said delayed reception signal, determines a guard interval section length based on said correlation value, and outputs said final guard interval section length based on the determined guard interval section length.
wherein said guard interval length determining section:
calculates a first correlation value as said correlation value between the last N samples of said guard interval section of said delayed reception signal (N is an optional natural number equal to or less than the number of samples in the guard interval section) and the last N samples of said effective symbol section of said reception signal,
elongates said final guard interval length when said first correlation value is smaller than a first threshold value,
calculates a second correlation value as said correlation value between N samples from the (N+1)-th sample to (2N)-th sample from the end of said guard interval section and N samples from the (N+1)-th sample to (2N)-th sample from the end of said effective symbol section, when said first correlation value is equal to or larger than said first threshold value,
keeps said final guard interval section length when said second correlation value is smaller than a second threshold value, and
shortens said final guard interval section length, when said second correlation value is equal to or larger than said second threshold value.

6. The guard interval length determining apparatus in an OFDM system according to claim 5, wherein said guard interval length determining section:
elongates said final guard interval section length based on a difference between said first correlation value and said first threshold value, when said first correlation value is smaller than said first threshold value,
shortens said final guard interval section length based on a difference between said second correlation value and said second threshold value when said second correlation value is equal to or larger than said second threshold value.

7. A guard interval length determining apparatus in an OFDM (orthogonal frequency division multiplexing) system, comprising:
a signal supply section which outputs a reception signal and a delayed reception signal obtained by delaying said reception signal by a length of an effective symbol section; and
a guard interval length determining section which adaptively determines a final guard interval section length from said reception signal and said delayed reception signal,
wherein said guard interval length determining section calculates at least a correlation value between a part of an effective symbol section of said reception signal and a part of a guard interval section of said delayed reception signal, determines a guard interval section length based on said correlation value, and outputs said final guard interval section length based on the determined guard interval section length,
wherein said guard interval length determining section:
calculates first to M-th correlation values said correlation values between first to M-th sections obtained by dividing the last MN samples (M and N are optional natural numbers that MN is equal to or less than the number of samples in said guard interval section) of said guard interval section for every N samples from the end of said guard interval section and corresponding ones of first to M-th sections obtained by dividing the last MN samples of said effective symbol section for every N samples from the end of said effective symbol section, respectively, elongates said final guard interval section length, when any one of said first to i-th correlation values (i is an optional natural number equal to or less than M−1) is smaller than a predetermined threshold value, keeps said final guard interval section length, when all of the first to i-th correlation values are equal to or larger than the threshold value and one of said (i+1)-th to j-th correlation values (j is an optional natural number equal to larger than i+1 or equal to or smaller than M) is smaller than the threshold value V, and shortens said final guard interval section length, when all of the first to j-th correlation values are equal to or larger than the threshold value.

8. The guard interval length determining apparatus in an OFDM system according to claim 7, wherein a k-th correlation value is first smaller than the threshold value, starting from the first correlation value, said guard interval length determining section:

elongates said guard interval section length longer when k is smaller, if k is equal to or larger than 1 and smaller than i, and shortens said guard interval section length when k is larger, if k is larger than j.

9. An OFDM (orthogonal frequency division multiplexing) receiving apparatus, comprising:

a guard interval length determining section which adaptively determines a final guard interval section length from a reception signal and a delayed reception signal obtained by delaying said reception signal by a length of an effective symbol section;

a guard interval removing section which removes a guard interval section from said reception signal based on said final guard interval section length from said guard interval length determining section to produce a guard-interval-section-removed signal;

a Fourier transforming section which carries out Fourier transform to said guard-interval-section-removed signal to produce a transformed signal;

a parallel/serial converting section which carries out parallel/serial conversion to said transformed signal to produce a converted signal; and a demodulating section which demodulates said converted signal to produce a demodulated data signal, wherein said length determining section calculates at least a correlation value between a part of said effective symbol section of said reception signal and a part of said guard interval section of said delayed reception signal, determines a guard interval section length based on said correlation value, and outputs said final guard interval section length based on the determined guard interval section length, wherein said length determining section comprises:

a correlation processing section which calculates said correlation value between the part of said effective symbol section of said reception signal and the part of said guard interval section of said delayed reception signal;

an averaging section which averages said correlation values over a plurality of symbols and outputs the average as a correlation value; and a determining section which determines the guard interval section length based on said correlation value from said averaging circuit, and determines said final guard interval section length based on the guard interval section length.

10. An OFDM receiving apparatus according to claim 9, wherein said guard interval length determining section comprises:

a signal supply section which outputs said reception signal and said delayed reception signal obtained by delaying said reception signal by said effective symbol length; and a length determining section which adaptively determines said final guard interval section length from said reception signal and said delayed reception signal.

11. An OFDM (orthogonal frequency division multiplexing) receiving apparatus, comprising:

a guard interval length determining section which adaptively determines a final guard interval section length from a reception signal and a delayed reception signal obtained by delaying said reception signal by a length of an effective symbol section;

a guard interval removing section which removes a guard interval section from said reception signal based on said final guard interval section length from said guard interval length determining section to produce a guard-interval-section-removed signal;

a Fourier transforming section which carries out Fourier transform to said guard-interval-section-removed signal to produce a transformed signal;

a parallel/serial converting section which carries out parallel/serial conversion to said transformed signal to produce a converted signal; and a demodulating section which demodulates said converted signal to produce a demodulated data signal, wherein said length determining section calculates at least a correlation value between a part of said effective symbol section of said reception signal and a part of said guard interval section of said delayed reception signal, determines a guard interval section length based on said correlation value, and outputs said final guard interval section length based on the determined guard interval section length, wherein said length determining section comprises:

a correlation processing section which calculates said correlation value between the part of said effective symbol section of said reception signal and the part of said guard interval section of said delayed reception signal;

an estimating section which estimates a correlation value based on a temporal change of said correlation values over a plurality of symbols; and a determining section which determines the guard interval section length based on said correlation value from said estimating section and determines said final guard interval section length based on the guard interval section length.

12. An OFDM (orthogonal frequency division multiplexing) receiving apparatus, comprising:

a guard interval length determining section which adaptively determines a final guard interval section length from a reception signal and a delayed reception signal obtained by delaying said reception signal by a length of an effective symbol section;

a guard interval removing section which removes a guard interval section from said reception signal based on said final guard interval section length from said guard interval length determining section to produce a guard-interval-section-removed signal;

a Fourier transforming section which carries out Fourier transform to said guard-interval-section-removed signal to produce a transformed signal;

a parallel/serial converting section which carries out parallel/serial conversion to said transformed signal to produce a converted signa; and a demodulating section which demodulates said converted signal to produce a demodulated data signal, wherein said length determining section calculates at least a correlation value between a part of said effective symbol section of said reception signal and a part of said guard interval section of said delayed reception signal, determines a guard interval section length based on said correlation value, and outputs said final guard interval section length based on the determined guard interval section length, wherein said length determining section:

calculates said correlation value between the last N samples of said guard interval section of said delayed reception signal (N is an optional natural number equal to or less than the number of samples in the guard interval section) and the last N samples of said effective symbol section of said reception signal, elongates said final guard interval section length when said correlation value is smaller than a first threshold value, keeps said final guard interval section length when said correlation value is equal to or larger than said first threshold value and smaller than a second threshold value larger than said first threshold value, and shortens said final guard interval section length when said correlation value is equal to or larger than said second threshold value.

13. The OFDM receiving apparatus according to claim 12, wherein said length determining section:

elongates said final guard interval section length based on a difference between said correlation value and said first threshold value, when said correlation value is smaller than said first threshold value, and shortens said final guard interval section length based on a difference between said correlation value and said second threshold value, when said correlation value is equal to or larger than said second threshold value.

14. An OFDM (orthogonal frequency division multiplexing) receiving apparatus, comprising:

a guard interval length determining section which adaptively determines a final guard interval section length from a reception signal and a delayed reception signal obtained by delaying said reception signal by a length of an effective symbol section;

a guard interval removing section which removes a guard interval section from said reception signal based on said final guard interval section length from said guard interval length determining section to produce a guard-interval-section-removed signal;

a Fourier transforming section which carries out Fourier transform to said guard-interval-section-removed signal to produce a transformed signal;

a parallel/serial converting section which carries out parallel/serial conversion to said transformed signal to produce a converted signal; and a demodulating section which demodulates said converted signal to produce a demodulated data signal, wherein said length determining section calculates at least a correlation value between a part of said effective symbol section of said reception signal and a part of said auard interval section of said delayed reception signal, determines a guard interval section length based on said correlation value, and outputs said final guard interval section length based on the determined guard interval section length, wherein said length determining section:

calculates a first correlation value as said correlation value between the last N samples of said guard interval section of said delayed reception signal (N is an optional natural number equal to or less than the number of samples in the guard interval section) and the last N samples of said effective symbol section of said reception signal, elongates said final guard interval length when said first correlation value is smaller than a first threshold value, calculates a second correlation value as said correlation value between N samples from the (N+1)-th sample to (2N)-th sample from the end of said guard interval section of said delayed reception signal and N samples from the (N+1)-th sample to (2N)-th sample from the end of said effective symbol section of said reception signal, when said first correlation value is equal to or larger than said first threshold value, keeps said final guard interval section length when said second correlation value is smaller than a second threshold value, and shortens said final guard interval section length, when said second correlation value is equal to or larger than said second threshold value.

15. The OFDM receiving apparatus according to claim 14, wherein said length determining section:

elongates said final guard interval section length based on a difference between said first correlation value and said first threshold value, when said first correlation value is smaller than said first threshold value, and shortens said final guard interval section length based on a difference between said second correlation value and said second threshold value when said second correlation value is equal to or larger than said second threshold value.

16. An OFDM (orthogonal frequency division multiplexing) receiving apparatus, comprising:

a guard interval length determining section which adaptively determines a final guard interval section length from a reception signal and a delayed reception signal obtained by delaying said reception signal by a length of an effective symbol section;

a guard interval removing section which removes a guard interval section from said reception signal based on said final guard interval section length from said guard interval length determining section to produce a guard-interval-section-removed signal;

a Fourier transforming section which carries out Fourier transform to said guard-interval-section-removed signal to produce a transformed signal;

a parallel/serial converting section which carries out parallel/serial conversion to said transformed signal to produce a converted signal; and a demodulating section which demodulates said converted signal to produce a demodulated data signal, wherein said length determining section calculates at least a correlation value between a part of said effective symbol section of said reception signal and a part of said guard interval section of said delayed reception signal, determines a guard interval section length based on said correlation value, and outputs said final guard interval section length based on the determined guard interval section length, wherein said length determining section:

calculates first to M-th correlation values said correlation values between first to M-th sections obtained by dividing the last MN samples (M and N are optional natural numbers that MN is equal to or less than the number of samples in said guard interval section) of said guard interval section of said delayed reception signal for every N samples from the end of said guard interval section and corresponding ones of first to M-th sections obtained by dividing the last MN samples of said effective symbol section of said reception signal for every N samples from the end of said effective symbol section, respectively, elongates said final guard interval section length, when any one of said first to i-th correlation values (i is an optional natural number equal to or less than M−1) is smaller than a predetermined threshold value, keeps said final guard interval section length, when all of the first to i-th correlation values are equal to or larger than the threshold value and one of said (i+1)-th to j-th correlation values (j is an optional natural number equal to larger than i+1 or equal to or smaller than M) is smaller than the threshold value V, and shortens said final guard interval section length, when all of the first to j-th correlation values are equal to or larger than the threshold value.

17. The OFDM receiving apparatus according to claim 16, wherein a k-th correlation value is first smaller than the threshold value, starting from the first correlation value, and said length determining section:

elongates said guard interval section length longer when k is smaller, if k is equal to or larger than 1 and smaller than i, and shortens said guard interval section length when k is larger, if k is larger than j.

18. A guard interval length determining method in an OFDM (orthogonal frequency division multiplexing) system, comprising the steps of:

(a) generating a delayed reception signal obtained by delaying a reception signal by a length of an effective symbol section; and (b) adaptively determining a final guard interval section length from said reception signal and said delayed reception signal, wherein said (a) adaptively determining step comprises the steps of:

calculating said correlation value between the part of said effective symbol section of said reception signal and the part of said guard interval section of said delayed reception signal;

averaging said correlation values over a plurality of symbols to output the average as an averaged correlation value;

determining the guard interval section length based on the averaged correlation value; and determining said final guard interval section length based on the guard interval section length.

19. A guard interval length determining in an OFDM (orthogonal frequency division multiplexing) system, comprising the steps of:

(a) generating a delayed reception signal obtained by delaying a reception signal by a length of an effective symbol section; and (b) adaptively determining a final guard interval section length from said reception signal and said delayed reception signal, wherein said (a) adaptively determining step comprises the steps of:

calculating said correlation value between the part of said effective symbol section of said reception signal and the part of said guard interval section of said delayed reception signal;

estimating a correlation value based on a temporal change of the correlation values over a plurality of symbols;

determining the guard interval section length based on the estimated correlation value; and determining said final guard interval section length from the determined guard interval section length.

20. A guard interval length determining in an OFDM (orthogonal frequency division multiplexing) system, comprising the steps of:

(a) generating a delayed reception signal obtained by delaying a reception signal by a length of an effective symbol section; and (b) adaptively determining a final guard interval section length from said reception signal and said delayed reception signal, wherein said (a) adaptively determining step comprises the steps of:

calculating said correlation value between the last N samples of said guard interval section of said delayed reception signal (N is an optional natural number equal to or less than the number of samples in the guard interval section) and the last N samples of said effective symbol section of said reception signal;

elongating said final guard interval section length when said correlation value is smaller than a first threshold value;

keeping said final guard interval section length when said correlation value is equal to or larger than said first threshold value and smaller than a second threshold value larger than said first threshold value; and shortening said final guard interval section length when said correlation value is equal to or larger than said second threshold value.

21. The guard interval length determining method according to claim 20, wherein said elongating step comprises the step of:

elongating said final guard interval section length based on a difference between said correlation value and said first threshold value, when said correlation value is smaller than said first threshold value; and wherein said shortening step comprises the step of:

shortening said final guard interval section length based on a difference between said correlation value and said second threshold value, when said correlation value is equal to or larger than said second threshold value.

22. A guard interval length determining in an OFDM (orthogonal frequency division multiplexing) system, comprising the steps of:

(a) generating a delayed reception signal obtained by delaying a reception signal by a length of an effective symbol section; and (b) adaptively determining a final guard interval section length from said reception signal and said delayed reception signal, wherein said (a) adaptively determining step comprises the steps of:

calculating a first correlation value as said correlation value between the last N samples of said guard interval section of said delayed reception signal (N is an optional natural number equal to or less than the number of samples in the guard interval section) and the last N samples of said effective symbol section of said reception signal;

elongating said final guard interval length when said first correlation value is smaller than a first threshold value;

calculating a second correlation value as said correlation value between N samples from the (N+1)-th sample to (2N)-th sample from the end of said guard interval section and N samples from the (N+1)-th sample to (2N)-th sample from the end of said effective symbol section, when said first correlation value is equal to or larger than said first threshold value;

keeping said final guard interval section length when said second correlation value is smaller than a second threshold value; and shortening said final guard interval section length, when said second correlation value is equal to or larger than said second threshold value.

23. The guard interval length determining method according to claim 22, wherein said elongating step comprises the step of:

elongating said final guard interval section length based on a difference between said first correlation value and said first threshold value, when said first correlation value is smaller than said first threshold value; and said shortening step comprises the step of:

shortening said final guard interval section length based on a difference between said second correlation value and said second threshold value when said second correlation value is equal to or larger than said second threshold value.

24. A guard interval length determining in an OFDM (orthogonal frequency division multiplexing) system, comprising the steps of:

(a) generating a delayed reception signal obtained by delaying a reception signal by a length of an effective symbol section; and (b) adaptively determining a final guard interval section length from said reception signal and said delayed reception signal, wherein said (a) adaptively determining step comprises the steps of:

calculating first to M-th correlation values said correlation values between first to M-th sections obtained by dividing the last MN samples (M and N are optional natural numbers that MN is equal to or less than the number of samples in said guard interval section) of said guard interval section for every N samples from the end of said guard interval section and corresponding ones of first to M-th sections obtained by dividing the last MN samples of said effective symbol section for every N samples from the end of said effective symbol section, respectively;

elongating said final guard interval section length, when any one of said first to i-th correlation values (i is an optional natural number equal to or less than M−1) is smaller than a predetermined threshold value;

keeping said final guard interval section length, when all of the first to i-th correlation values are equal to or larger than the threshold value and one of said (i+1)-th to j-th correlation values (j is an optional natural number equal to larger than i+1 or equal to or smaller than M) is smaller than the threshold value V; and shortening said final guard interval section length, when all of the first to j-th correlation values are equal to or larger than the threshold value.

25. The guard interval length determining method according to claim 24, wherein a k-th correlation value is first smaller than the threshold value, starting from the first correlation value, and said elongating step comprises the step of:

elongating said guard interval section length longer when k is smaller, if k is equal to or larger than 1 and smaller than i; and said shortening step comprises the step of:

shortening said guard interval section length when k is larger, if k is larger than j.

* * * * *